(12) United States Patent
Hetterscheid et al.

(10) Patent No.: US 6,837,782 B2
(45) Date of Patent: Jan. 4, 2005

(54) DEVICE FOR PROCESSING A SLAUGHTER PRODUCT

(75) Inventors: Hendrikus Antonius Theresia Petrus Hetterscheid, Boxmeer (NL); Eric Hendricus Werner Peters, Boxmeer (NL); Adrianus Josephes van den Nieuwelaar, Gemert (NL); Petrus Christianus Hendrikus Janssen, Wilbertoord (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 10/015,338

(22) Filed: Dec. 11, 2001

(65) Prior Publication Data

US 2002/0102933 A1 Aug. 1, 2002

Related U.S. Application Data

(63) Continuation of application No. PCT/NL00/00395, filed on Jun. 8, 2000.

(30) Foreign Application Priority Data

| Jun. 11, 1999 | (NL) | 1012304 |
| Apr. 5, 2000 | (NL) | 1014845 |

(51) Int. Cl.$^7$ ................................................ A22B 7/00
(52) U.S. Cl. .................................................... 452/179
(58) Field of Search ................................ 452/106, 187, 452/107, 153, 109, 163, 113, 170, 117, 169, 123, 167, 124, 166, 188, 195, 196

(56) References Cited

U.S. PATENT DOCUMENTS

| 2,557,707 | A | | 6/1951 | Utter |
| 4,648,155 | A | | 3/1987 | Burnett |
| 4,780,930 | A | | 11/1988 | Sparkia |
| 5,080,630 | A | | 1/1992 | Tieleman et al. |
| 5,083,974 | A | | 1/1992 | Martin et al. |
| 5,092,815 | A | * | 3/1992 | Polkinghorne ............... 452/179 |
| 5,366,406 | A | | 11/1994 | Hobbel et al. |
| 5,466,185 | A | | 11/1995 | Martin et al. |
| 5,474,491 | A | | 12/1995 | Koch |
| 5,762,547 | A | * | 6/1998 | Allain ......................... 452/179 |
| 5,833,527 | A | | 11/1998 | Hazenbroek et al. |
| 6,179,701 | B1 | * | 1/2001 | Tieleman ..................... 452/179 |
| 6,179,702 | B1 | * | 1/2001 | Hazenbroek ................. 452/188 |
| 6,478,668 | B2 | * | 11/2002 | Visser et al. ................. 452/179 |

FOREIGN PATENT DOCUMENTS

| EP | 0 086 700 A1 | 8/1983 |
| EP | 0 245 543 A1 | 11/1987 |
| EP | 254 332 A1 | 1/1988 |
| EP | 0 390 979 A1 | 10/1990 |
| EP | 0 497 014 A1 | 8/1992 |

(List continued on next page.)

OTHER PUBLICATIONS

Search Report issued in NL 1012304 and its English translation.
Search Report issued in PCT/NL00/00395.

*Primary Examiner*—Thomas Price
(74) *Attorney, Agent, or Firm*—Kristin L. Johnson; Mitchell G. Stockwell; Kilpatrick Stockton LLP

(57) ABSTRACT

A device for processing a slaughter product comprises a conveyor which can move along a path and to which a first body, which can rotate about a first axis, is connected. A second body, which can rotate about a second axis, is connected to the first body. A first actuating device sets various first angular positions of the first body with respect to the first axis, while a second actuating device sets various second angular positions of the second body with respect to the second axis. A locking device fixes the first and/or second angular position. A slaughter product fixing device connects a breast portion of the slaughter product to the second body.

44 Claims, 33 Drawing Sheets

FOREIGN PATENT DOCUMENTS

| | | |
|---|---|---|
| EP | 0 539 134 A1 | 4/1993 |
| EP | 0 551 156 A1 | 7/1993 |
| EP | 0 695 506 A2 | 2/1996 |
| EP | 0 756 826 A2 | 2/1997 |
| EP | 0 761 100 A1 | 3/1997 |
| EP | 0 577 821 B1 | 6/1999 |
| FR | 2 589 452 A1 | 5/1987 |
| NL | 1 000 935 C | 6/1997 |
| RU | 2078507 C1 | 5/1997 |
| WO | WO 93/13671 | 7/1993 |
| WO | WO 99/16321 | 4/1999 |
| WO | WO 00/76323 A1 | 12/2000 |

* cited by examiner

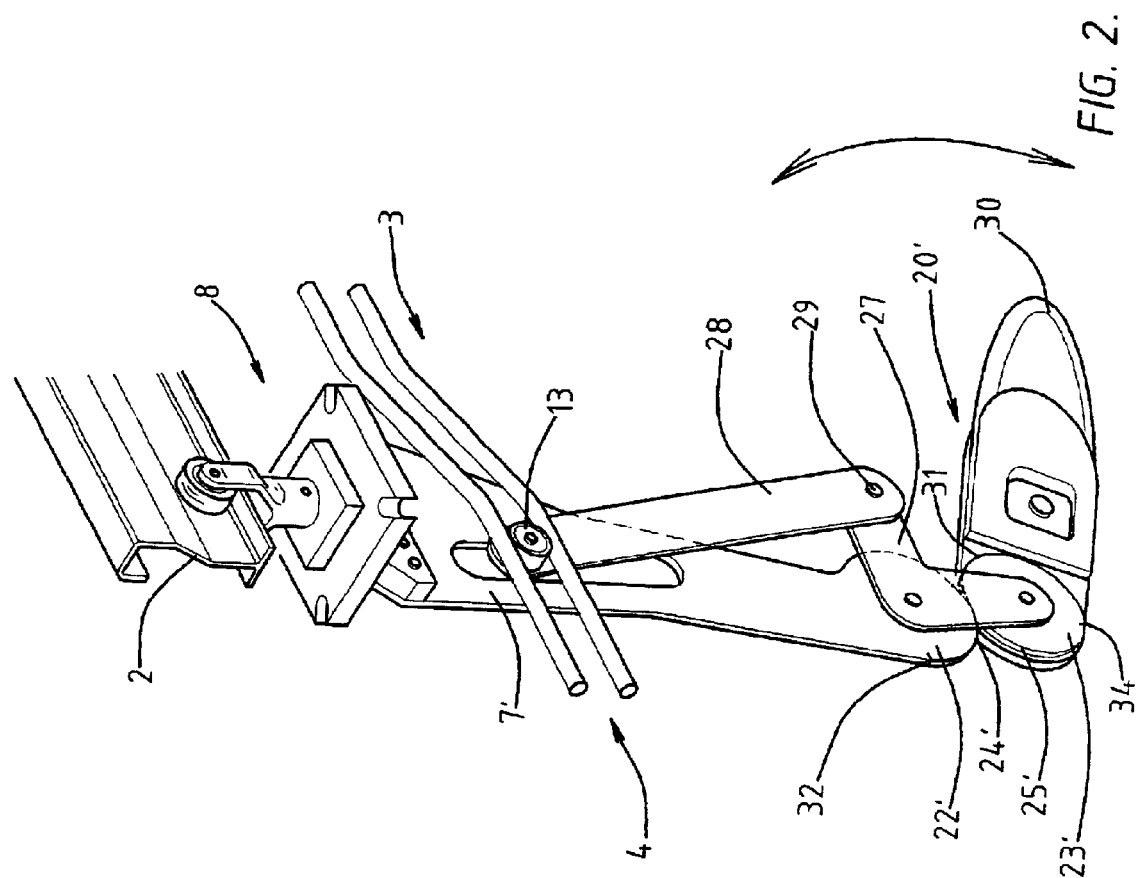

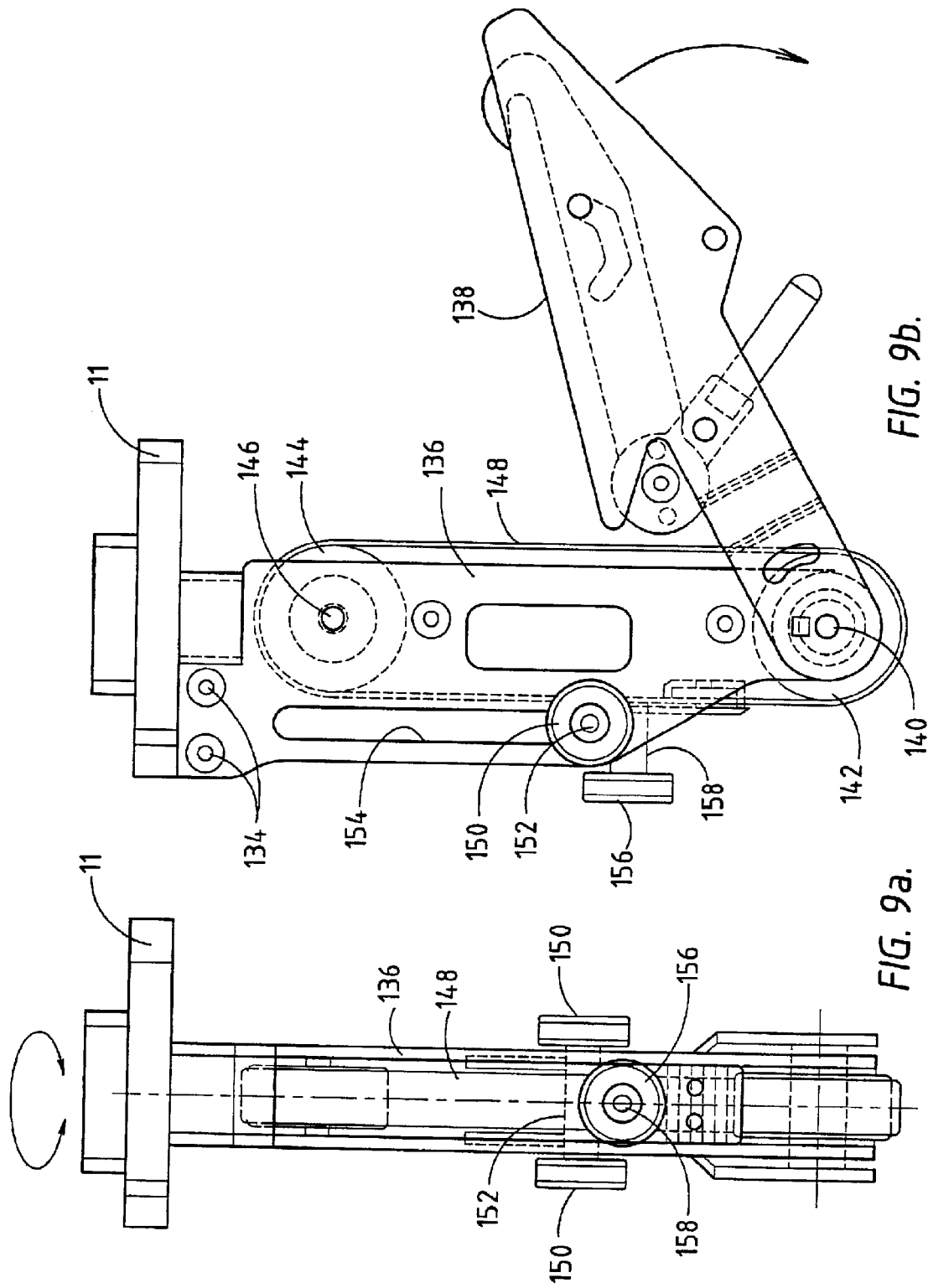

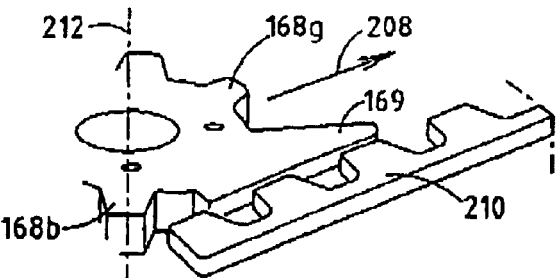
FIG. 15f.
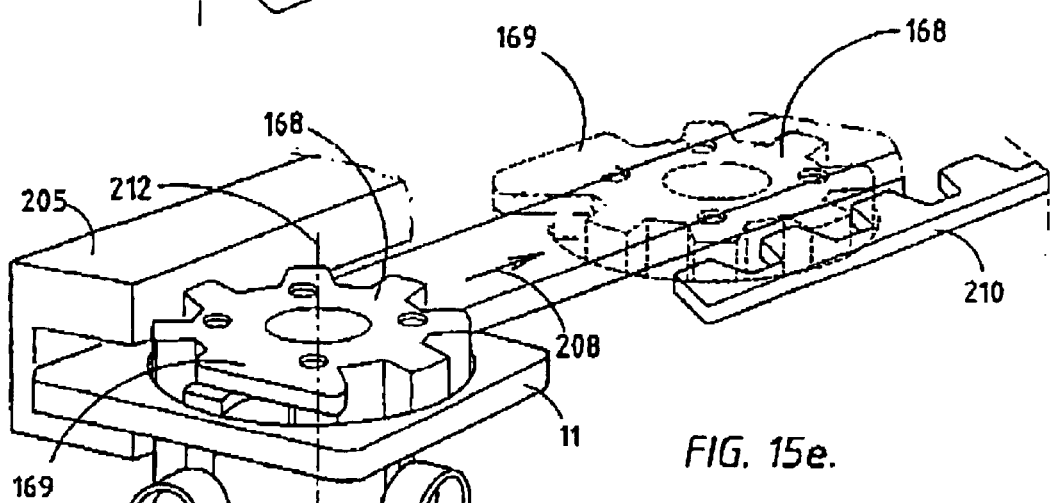
FIG. 15e.
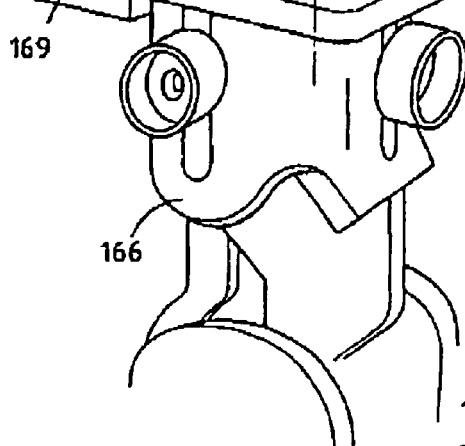
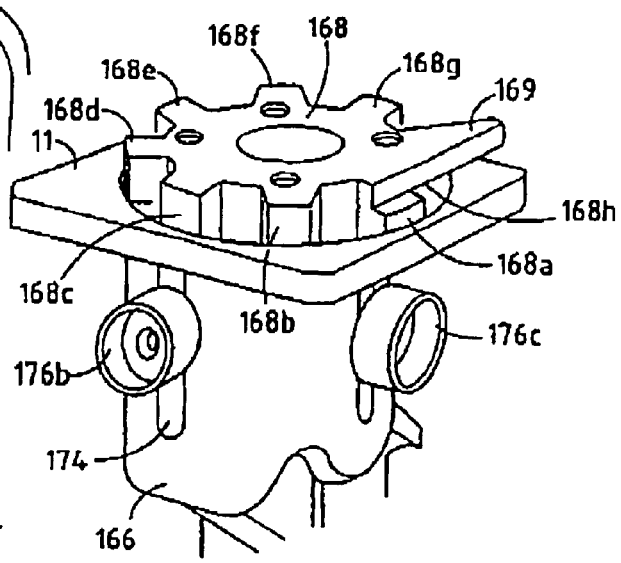
FIG. 15d.

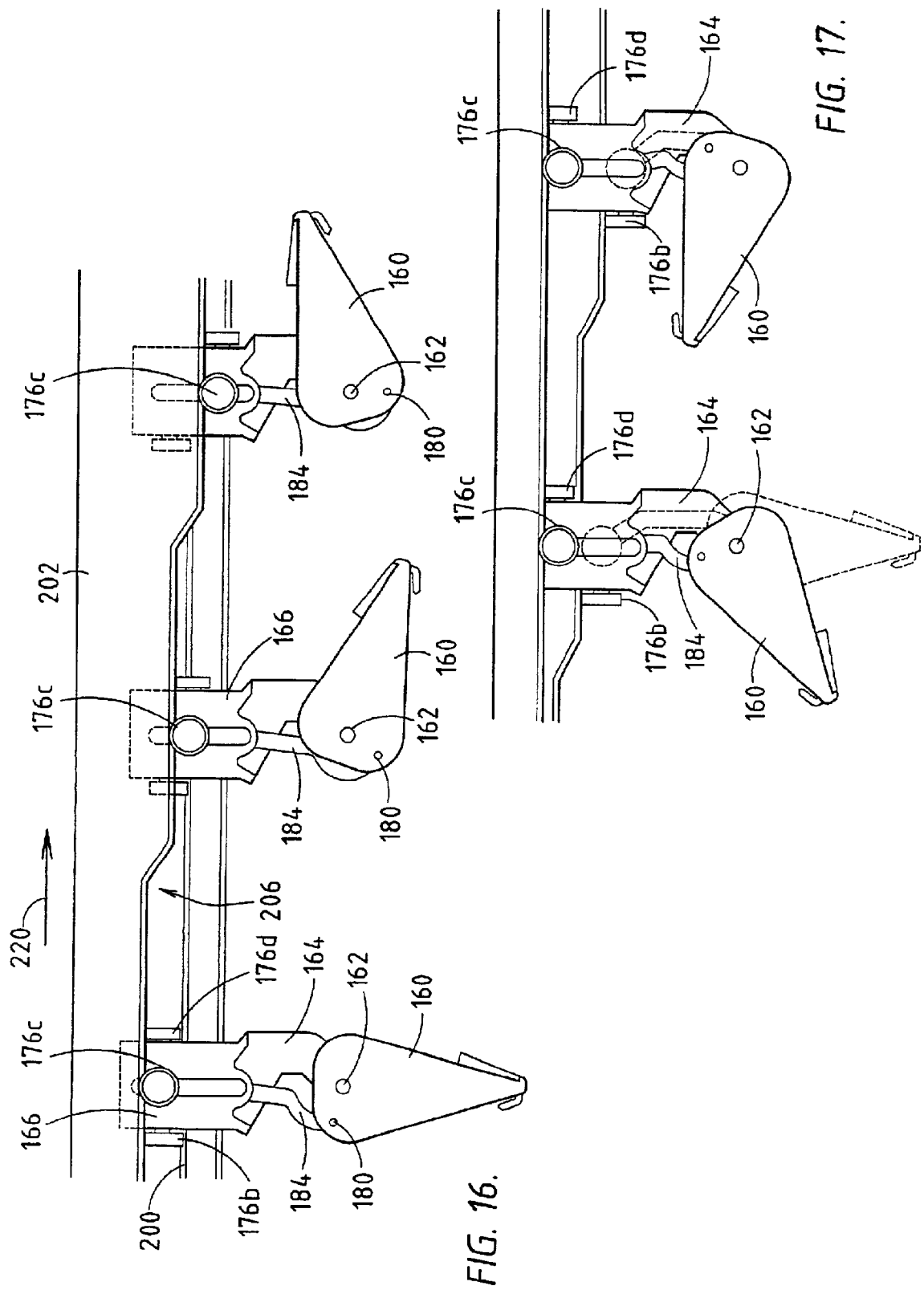

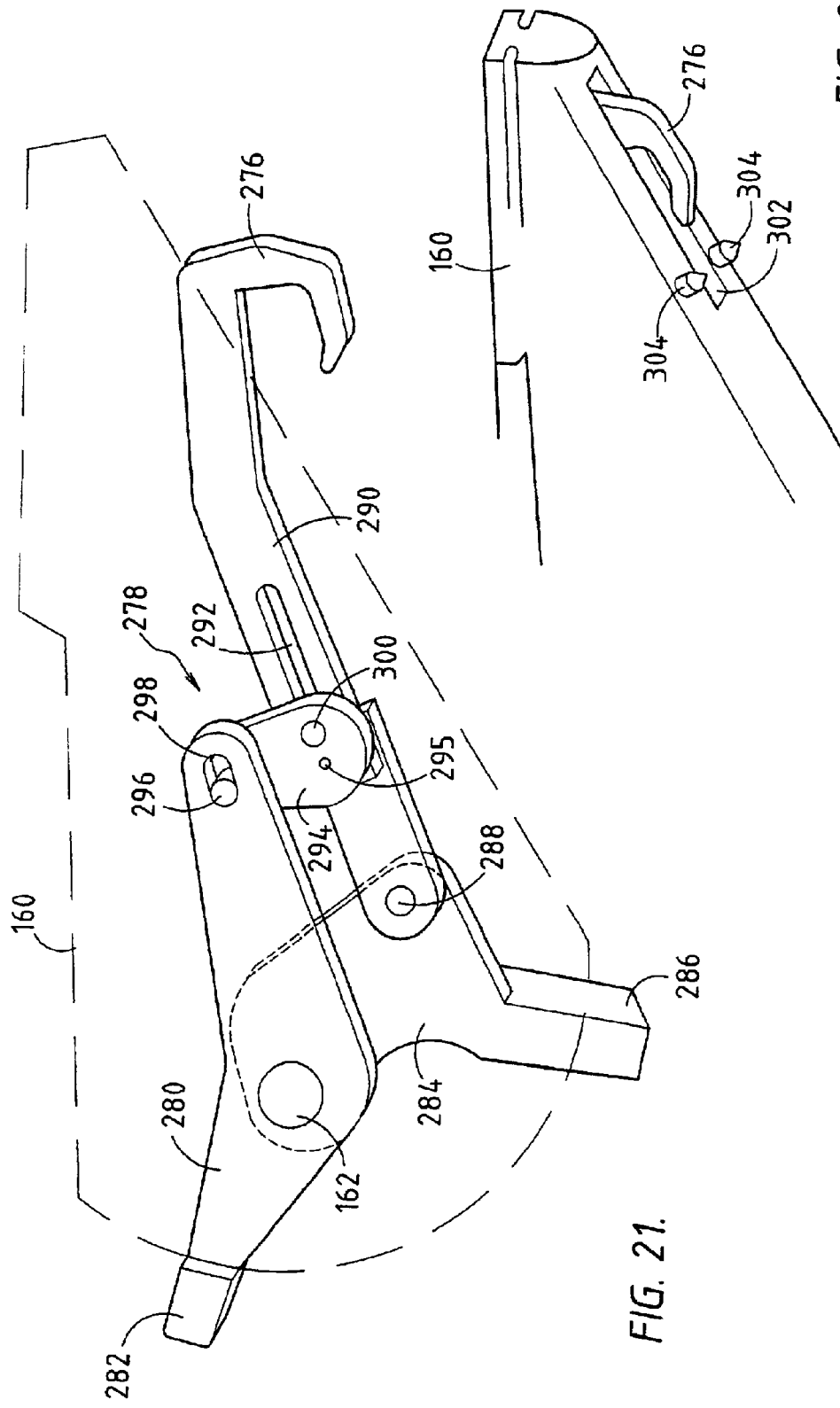

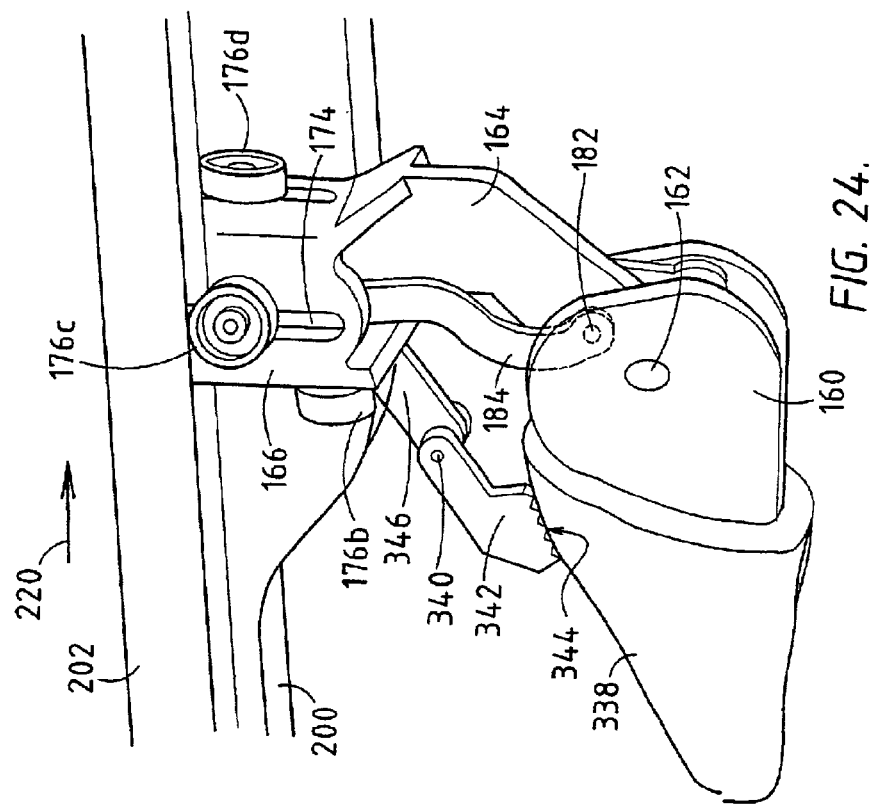
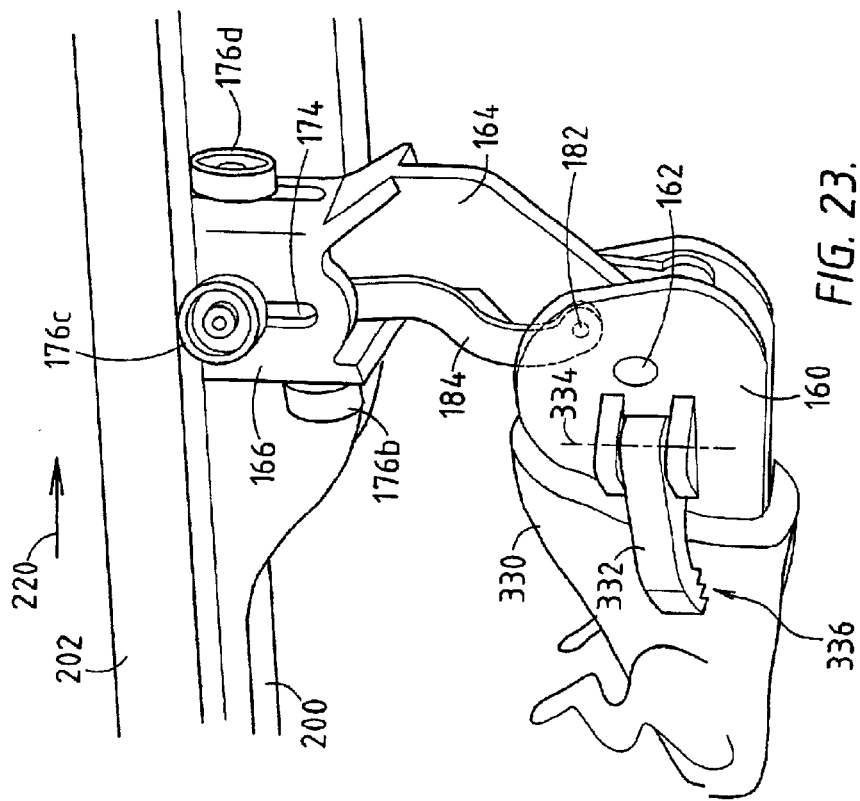

DEVICE FOR PROCESSING A SLAUGHTER PRODUCT

CROSS-REFERENCE TO RELATED APPLICATION

This is a continuation application of PCT/NL00/00395 filed Jun. 8, 2000 claiming the priority of Dutch Patent Applications Nos. 1012304 filed Jun. 11, 1999 and 1014845 filed Apr. 5, 2000, all herein incorporated by reference.

FIELD OF THE INVENTION

The invention relates to a device for processing a slaughter product.

In this context, a slaughter product is understood to mean a slaughtered animal or a part thereof which is obtained during processing after the slaughtered animal has been slaughtered. The slaughtered animal may be poultry, such as chickens, turkeys, ducks, geese or ostriches, but may also be small or large livestock, such as cattle, horses, pigs, sheep or goats.

BACKGROUND OF THE INVENTION

In the mechanized and automated processing of slaughter products, use is in many cases made of carriers, such as hooks and supports, to which a slaughter product can be connected. A carrier of this nature ensures that the slaughter product is supported, so that processing operations can be carried out on the product by hand or machine. The carrier can often be moved into a limited number of different positions or orientations in order for different processing operations or processing steps to be carried out on the slaughter product which is connected thereto. The support may be arranged at one location, but is usually connected to a conveyor, by means of which the slaughter product can be conveyed past various processing stations.

U.S. Pat. No. 4,780,930 describes a device for dividing poultry into portions, in which device carriers for the poultry are displaced along a predetermined, endless path by a conveyor. The carriers can rotate about a vertical axis into various angular positions as a result of stationary stop blocks being arranged in the path of pins which are connected to the carriers and project sideways.

French Patent Application No. 2,589,452 again describes a device for dividing poultry into portions, in which device carriers for the poultry are displaced along a predetermined path by a conveyor. The carriers can rotate about a vertical axis into various angular positions as a result of the carrier being connected to a body which is provided with laterally directed projections and as a result of a stationary pin being arranged in the path of one of the projections.

European Patent Application No. 551,156, U.S. Pat. Nos. 5,083,974 and 4,648,155 describe a device for filleting the body of poultry. For this purpose, the body is arranged on a carrier which, by means of a conveyor, can be displaced past various processing stations in order to be subjected to a number of processing operations. The carrier can be pivoted about a horizontal axis and, to this end, is provided with one or more actuating protrusions which are able to interact with guides which are arranged stationary along the path of the carrier in order to determine the angular position of the carrier.

European Patent Application No. 756,826 describes a device for processing a slaughtered animal, having a carrier which can pivot about a horizontal axis and hangs from an overhead conveyor. At a distance from the axis, the carrier is pivotably connected to one end of an arm, the opposite end of which is provided with a protrusion which can be guided inside a guide slot in an actuating member, which is arranged stationary along the path of the carrier, in order to determine the angular position of the carrier.

U.S. Pat. No. 5,080,630 describes a device for processing slaughtered poultry, in which a number of push-on units, each provided with a carrier, are conveyed along a horizontal, endless path. The carrier can pivot about a horizontal axis with respect to an arm, which in turn is fixedly attached to a plate which can be displaced with a conveyor. An actuating rod, which at its ends is provided with protrusions, is arranged on the arm in such a manner that it can pivot about a horizontal axis. One end of the actuating rod is pivotably connected to one end of a connecting rod. The other end of the connecting rod is pivotably connected to the carrier. Consequently, pivoting of the actuating rod as a result of the protrusions of the actuating rod being guided in guide grooves causes the carrier to pivot into a predetermined position.

European Patent Application No. 695,506 describes a filleting device for slaughtered poultry, in which use is made of the carriers which are described in European Patent Application No. 551,156. European Patent Application No. 695,506 also shows carriers, which are connected to a conveyor, in the form of hooks for poultry, a carrying part of which can rotate into a defined angular position about a vertical axis. For this purpose, each hook is provided with a Maltese cross which can be adjusted by means of one or more pins which are arranged stationary along the path of the hook, as shown in more detail in European Patent Application No. 577,821.

European Patent Application No. 254,332 describes a fixing support for filleting a breast portion of poultry. The fixing support is displaced by means of a conveyor in order to move the breast portion sideways. The fixing support can be pivoted about a horizontal axis as a result of an actuating element, which is arranged stationary along the path of the fixing support, being made to engage on a rotary element connected to the fixing support.

All the carriers according to the prior art which have been described above provide only one degree of freedom for manipulation of the slaughter product, since the carrier can only pivot or rotate about one horizontal or vertical axis. This considerably limits the possible options for carrying out processing operations on the slaughter product, either by hand or by means of tools arranged along the path of the carrier.

U.S. Pat. No. 5,466,185 describes a device which offers two degrees of freedom for manipulation of the poultry carcass. The device is intended for filleting a carcass of poultry, a carrier comprising a body with a tapering end which is intended to be fitted into the chest of the carcass. Via an arm which extends substantially in the horizontal direction, the carrier is connected to a guide plate which is moved along an endless path by a conveyor. Processing operations on the poultry take place when the carrier is situated above the guide plate. The carrier can pivot about a horizontal axis with respect to the arm, while the arm can pivot about a vertical axis with respect to the guide plate.

Pivoting of the carrier about the horizontal axis is controlled by a pin which is connected to the carrier being moved in a guide slot which extends along a section of the path. A first drawback of this pin/guide slot structure is that without the cooperation between the pin and the guide slot, the carrier adopts an angular position which is not clearly defined about the horizontal axis, since there is no fixing of the angular position. A second drawback of the pin/guide slot design selected is that, when the pin and the guide slot interact, there is no clear relationship between various positions (forward and backward) of the carrier and the vertical position of the pin.

Pivoting of the carrier about the vertical axis is obtained by causing a wheel which is connected to the arm to come into contact with a block which is arranged in a fixed position along the path of the guide plate. A problem in this case is that the angular position of the carrier about the vertical axis which is reached as a result is arbitrary, since there is no fixing of this position.

SUMMARY OF THE INVENTION

An object of the invention is to provide a device which has at least two degrees of freedom for the manipulation of a slaughter product and fixes positions in such a manner that they can be determined accurately, so that a slaughter product which is connected to the device can be processed optimally and, in addition, as efficiently, easily and inexpensively as possible, both by hand and by mechanical, automated means.

For this purpose, the device according to the invention comprises: a conveyor which can move along a path; a first body which is connected to the conveyor in such a manner that it can rotate about a first axis; a second body which is connected to the first body in such a manner that it can rotate about a second axis; first actuating means for setting various first angular positions of the first body with respect to the first axis; second actuating means for setting various second angular positions of the second body with respect to the second axis; and locking means for fixing the first and/or second angular position.

A device of this nature provides a high degree of flexibility in the positioning of the slaughter product, with the result that processing operations which previously could only be performed at relatively high cost, owing to the use of (extra) staff or machines, or could not be performed at all, at least not in a mechanical, automated manner, can be carried out on the slaughter product. In particular, with the device according to the invention a slaughter product can be moved in the direction of a plane which is parallel to the path of the conveyor and in the direction of a plane which is perpendicular to the path of the conveyor, so that a specific processing operation can be carried out in the most appropriate position.

In one possible design, which will be described in more detail below, the degree of freedom about the first axis is 360°, while the degree of freedom about the second axis may be 290°.

In a preferred embodiment, the locking means comprise first locking means for fixing the first angular position, and second locking means for fixing the second angular position, the first or second locking means being formed by the first or second actuating means, respectively, by causing the action of the actuating means to endure after a specific angular position has been reached, in order to fix this angular position.

The first or second locking means may be incorporated in the first or second body, respectively, for example in the form of a ball which can be moved counter to a prestress and can click into various recesses in order to fix predetermined angular positions of the first or second body, but in an alternative advantageous embodiment, the first or second locking means may be arranged along the path of the conveyor in order to fix any angular position which is reached, for example by providing support for the first or second body at one or more suitable points. In particular, the first or second locking means in such an arrangement may be designed in such a manner that they do not act directly on the first or second body, but rather on the slaughter product which is connected to the second body, with the result that the angular position is fixed indirectly via the slaughter product.

Preferably, the device according to the invention is designed in such a manner that the second body is situated beneath the first body in at least one of the second angular positions, in particular hanging freely. This means that, for example, a breast portion or front half of poultry (without the legs) which is connected to the second body can be moved into the same position as if it were hanging by its legs, so that existing breast-portion or front-half processing devices which were originally used for processing poultry hanging by its legs can be combined with the device according to the invention without problems. In a preferred embodiment, the conveyor is an overhead conveyor. The use of an overhead conveyor prevents unnecessary space being taken up for a conveyor on the floor, and also contamination of the conveyor by animal material which comes off the slaughter product and falls onto the conveyor is prevented.

If the first axis is substantially vertically oriented, a rotation of a first body and the second body situated beneath it can be brought about particularly quickly (with relatively high accelerations and decelerations) and with little energy, since the angular moment of inertia in this way is small. As a result, processing devices which require different angular positions of the slaughter product can be installed at short distances apart even where high conveying speeds are used.

To achieve a simple design of the first and second actuating means, the second axis is preferably oriented substantially perpendicular to the first axis.

If the first axis and the second axis cross one another at a distance of at most 0.1 m, various assemblies comprising first and second bodies may be situated at a short distance from one another in the conveyor, in particular at intervals of 12 inches, and can still adopt all positions within at least two degrees of freedom independently of one another, i.e. without impeding one another, both with and without a slaughter product. In a preferred embodiment, the first and second axes intersect one another.

In general, the first and second actuating means may either be incorporated substantially completely in that part of the device which moves with the conveyor or may be substantially partly incorporated in that part of the device which moves with the conveyor and may partly be separate from this part.

One example of the first of these variants is where one or more actuators, with an associated power supply and an optionally wireless control arrangement for the latter are incorporated in that part of the device which moves with the conveyor, in order to set an angular position of the first body with respect to the first axis, and of the second body with respect to the second axis.

An example of the second variant is where part of a mechanical actuating structure is incorporated in that part of the device which moves with the conveyor, and another part of the mechanical actuating structure is arranged (stationary) along the path of the conveyor.

In a preferred embodiment of the device according to the invention, the first body is provided with projections or recesses which extend substantially perpendicular to the first axis and can be actuated by first actuating means which are arranged along the path of the conveyor, for example at least one stop, pin or the like arranged along the path of the conveyor, in order to set an angular position of the first body. In a more detailed arrangement, the first body comprises a gearwheel, and the first actuating means comprise at least one toothed structure which is arranged along the path of the conveyor and engages on the gearwheel. If the first body has been moved into a defined angular position in order for a processing operation to be carried out, and is then to be moved into another angular position for a subsequent processing operation to be carried out, a toothed structure is arranged along the path of the conveyor in such a manner that the desired rotation of the first body from the first angular position into the second angular position is obtained when it passes the toothed structure which may, for example, comprise a strip which is provided with teeth along a longitudinal side thereof.

Since in this way it is only possible to create angular position differences, but an absolute angular-position setting is not reliably possible without certain knowledge of a starting angular position, the invention provides a preferred embodiment in which the gearwheel is provided with active teeth over a first section of its circumference and, over a second section of its circumference, is not provided with active teeth, or at least is not provided with active teeth which engage in the toothed structure, the toothed structure being adapted to engage only on the teeth of the first section of the circumference. Due to the absence of active teeth on the gearwheel, the gearwheel, given sufficient teeth on the toothed structure acting on the gearwheel, after all the active teeth of the gearwheel have passed, is always moved into a single, defined, absolute angular position during the passage of the toothed structure, from which position a predefined angular rotation can then be brought about with the aid of a subsequent toothed structure which is arranged along the path of the conveyor. Preferably, the gearwheel is provided, adjacent to the second section of its circumference, with a protrusion for blocking rotation of the first body about the first axis in a direction of rotation, the toothed structure being situated opposite said second section of the circumference of the gearwheel, and therefore not driving the gearwheel. In this way, the possibility of the gearwheel being rotated further in the said direction of rotation, for whatever reason, is prevented. Rotation of the gearwheel in the opposite direction is also prevented, since in that case the toothed structure will engage on the active teeth of the gearwheel, and will set the gearwheel back until blocking is brought about once again.

In a preferred embodiment, the first section and the second section of the circumference of the gearwheel extend over a section of the height of the gearwheel, and over the remaining section of its height the gearwheel is provided with active teeth along the entire circumference. The former section of the height of the gearwheel teeth can be used, interacting with a toothed structure arranged along the path of the conveyor, to place the first body in a clearly defined angular position, as explained above, after which a second toothed structure, which engages on the latter section of the height of the gearwheel teeth, can be used to move the gearwheel out of a clearly defined angular position into another clearly defined angular position. The use of (uniform) teeth in the first actuating means results in a constant rotational speed of the first body between a starting angular position and a finishing angular position, irrespective of the magnitude of the starting angular position or the finishing angular position.

It will be clear that the above-described first actuating means, comprising a gearwheel and at least one toothed structure engaging on the gearwheel, can be used not only in devices according to the invention, but also in other devices which comprise at least one first body which can pivot about a first axis.

The device according to the invention preferably comprises second actuating means, in the form of a crankshaft mechanism having at least one crank, so that a rectilinear movement of an actuating means can easily be converted into a rotary movement of the second body about the second axis. In particular, the second actuating means comprise at least one actuating protrusion which acts on the at least one crank and is intended to engage in a slot in an actuating element arranged along the path of the conveyor. The actuating element may be arranged in a fixed position along the path, but may also be arranged in such a manner that it can move, in particular under control, in order for the second actuating means to be optionally operational as desired. It should be noted here that the latter design is obviously also possible for other types of parts of the first and second actuating means which are arranged along the path of the conveyor.

In a preferred embodiment, the crankshaft mechanism has a first and a second crank, which cranks, as seen in a plane which is perpendicular to the second axis, engage on the second axis at an angle to one another which is not 0 degrees. With this measure, it is possible to prevent the position of the second body becoming undefined as a result of a crank in the crankshaft mechanism passing a dead centre position, since the other crank is then not at a dead centre position, and a movement of the latter crank leads to a clearly defined angular position of the second body.

In another preferred embodiment, each crank is provided with at least two actuating protrusions for actuating the crankshaft mechanism in at least two different first angular positions of the first body, so that the angular position of the second body can be set in various first angular positions of the first body.

In a further preferred embodiment, the second actuating means comprise a gear rack mechanism having a gearwheel which is connected to the second body and the teeth of which mesh with the teeth of a rack bar or toothed belt which is connected to the first body. The angular position of the second body with respect to the second axis can be set by means of a translational movement of the rack bar or the toothed belt. For this purpose, in a preferred embodiment the second actuating means comprise at least one actuating protrusion which engages on the rack bar or toothed belt and is intended to engage in a slot in an actuating element arranged along the path of the conveyor.

In another variant embodiment of the second actuating means, the latter comprise a first rolling body and a second rolling body, which can roll along one another, each rolling body defining an associated rolling surface for the other rolling body rolling along it. To achieve reliable operation, each of the rolling bodies is provided, at the location of the associated rolling surface, with toothing, by means of which the rolling body engages with the other rolling body. Preferably, each rolling surface extends, with an associated radius, in the form of an arc of a circle about a central line associated with the rolling body. In particular, the central lines of the two rolling bodies are parallel.

In a simple preferred embodiment, a flexible cord is provided which, at one end, is fixedly connected to one of the rolling bodies and extends along the associated rolling surface to the contact point between the two rolling surfaces and, from there, along the rolling surface of the other rolling body, to which the other end of the cord is fixed.

In an embodiment in which the first rolling body is stationary connected to the first body, the second rolling body is connected, via an arm, to the first body, which arm can rotate about the central line of the first rolling body with respect to the first body and can rotate about the central line of the second rolling body with respect to the second rolling body, an actuating protrusion being coupled to the arm in such a manner that a movement of the actuating protrusion causes a pivoting movement of the arm. Advantageously, the actuating protrusion is guided with respect to the first body in an associated guide and is connected, via a coupling rod, to a point on the arm which is at a distance from the central line of the first rolling body. The actuating protrusion may be guided in a straight guide with respect to the first body.

To provide the device according to the invention with a third degree of freedom, in a preferred embodiment third actuating means are provided for setting various third angular positions of the second body with respect to a third axis, and third locking means are provided for fixing the third angular position. The third axis differs from the first or second axis and is preferably perpendicular to the second axis. If the second body is elongate, in a preferred embodiment the third axis is oriented substantially parallel to the longitudinal direction of the second body.

In an advantageous embodiment, the second body is connected to a slaughter product carrier, the slaughter product fixing means being adapted to fix the slaughter product, such as a front half of slaughtered poultry, to the slaughter product carrier.

The slaughter product carrier has in particular a surface which is intended to come into contact with the slaughter product. In a first preferred embodiment, the slaughter product fixing means comprise a first fixing element which is arranged on that side of the surface which is remote from the slaughter product and is provided with at least one projection which, via an opening in the surface, is brought into contact with the slaughter product under a prestress directed away from the slaughter product carrier. In this case, the projection penetrates slightly into that side of the slaughter product which is directed towards the slaughter product carrier, thus preventing the slaughter product from moving parallel to the surface. The at least one projection may be formed by an end of a pin, a knurled side of the first fixing element or the like. In the second instance, the slaughter product fixing means may comprise a second fixing element which is arranged on that side of the surface which faces towards the slaughter product, and is provided with at least one projection which is brought into contact with the slaughter product under a prestress directed towards the slaughter product carrier. The second fixing element pushes the slaughter product securely onto the slaughter product carrier and prevents movement of the slaughter product in the direction of the surface of the slaughter product carrier. In the third instance, the slaughter product fixing means may comprise a third fixing element which is arranged on that side of the surface facing away from the slaughter product, and is provided with a hook which, via an opening in the surface, is brought into contact with the slaughter product under a prestress directed towards the slaughter product carrier. The hook can be moved in a controllable manner, in such a way that it is situated substantially beneath the surface when the slaughter product is placed on the slaughter product carrier, after which the hook is moved over the surface and is hooked around a portion of the slaughter product in order to clamp the slaughter product to the slaughter product carrier. If at least one protrusion or pin is arranged in the vicinity of the opening on that side of the surface which faces towards the slaughter product, this protrusion or pin, as a result of the prestress exerted on the hook, will penetrate at least part-way into the slaughter product, to prevent it from moving in the direction of the surface.

The slaughter product carrier may be formed in such a manner that one end thereof can move with respect to the remaining part thereof. Consequently, the end may, for example, be pivotable or translatable, with the result that a fixing force can be exerted on a slaughter product.

The preceding text referred to slaughter product fixing means which move with the conveyor. However, the slaughter product fixing means may also be arranged along the path of the conveyor, in which case the first and/or the second body are fixed only at the location of slaughter product fixing means of this nature, and are not fixed at locations where the slaughter product fixing means are interrupted.

In a first preferred embodiment, the slaughter product fixing means comprise at least one guide rail which is arranged along the path of the conveyor, extends substantially in the direction of the path of the conveyor and is intended to come into contact with the slaughter product. The slaughter product is then in contact with and moves with respect to the guide rail. If the slaughter product fixing means comprise at least one belt which is arranged along the path of the conveyor and extends substantially in the direction of the path of the conveyor, one surface of the belt moving in the direction of the conveyor and being intended to come into contact with the slaughter product, the slaughter product and a slaughter product fixing means of this nature do not have to move with respect to one another during fixing.

Furthermore, it is possible for a slaughter product processing means, which is arranged along the path of the conveyor and is intended to come into contact with the slaughter product in order for a processing operation to be carried out on the slaughter product, to function as the slaughter product fixing means.

Further preferred embodiments are described in the claims.

The claims and many of the attendant advantages will be more readily appreciated as the same becomes better understood by reference to the following detailed description and considered in connection with the accompanying drawings in which like reference symbols designate like components or component having like functions.

BRIEF DESCRIPTION OF THE DRAWINGS

FIG. 2 shows a variant of the device shown in FIG. 1.

FIGS. 9a and 9b respectively show a rear view and side view of a variant of the exemplary embodiment shown in FIG. 4.

FIG. 15d shows a perspective view of part of the device shown in FIG. 10, in more detail.

FIG. 15e shows a perspective view of the way in which a gearwheel is actuated by a toothed structure.

FIG. 15f shows a perspective view of a starting position of a gearwheel shown in FIG. 15e.

FIGS. 16 and 17 show perspective views of the manipulation of the exemplary embodiment shown in FIG. 10.

FIGS. 18a and 18b show perspective views of the way in which a slaughter product is arranged on a carrier from the exemplary embodiment shown in FIG. 10, in the operating position shown in FIG. 17a.

FIG. 21 shows a perspective view of a mechanical actuation of a hook arranged in a slaughter product carrier.

FIG. 21a shows a perspective view of an end of a product carrier with the hook shown in FIG. 21.

FIG. 23 shows a perspective view of another slaughter product fixing means.

FIG. 24 shows a perspective view of a further slaughter product fixing means.

DESCRIPTION OF THE PREFERRED EMBODIMENTS

Figure 1B:
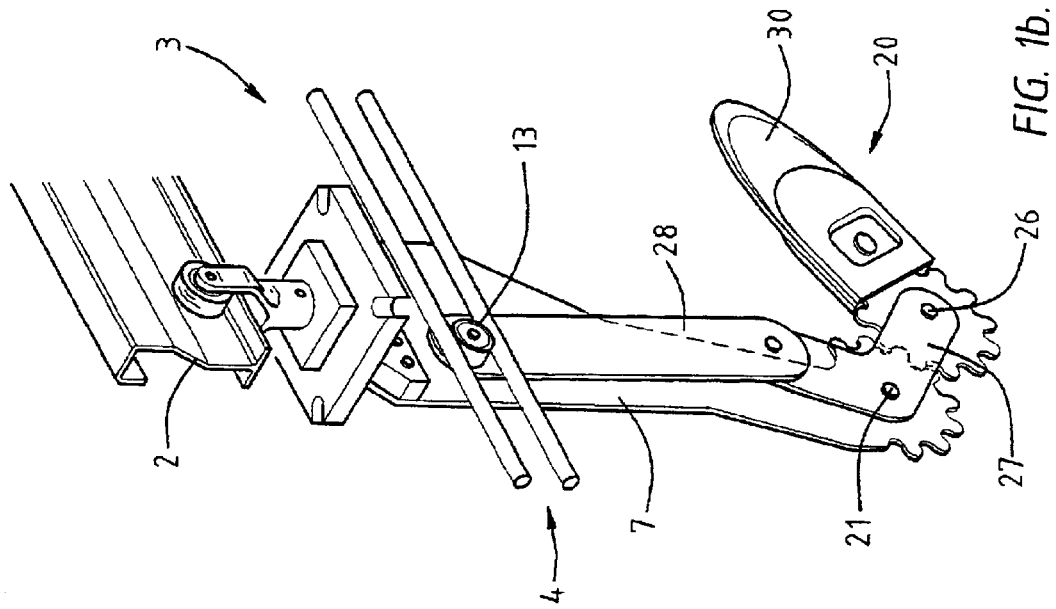
FIGS. 1a, 1b and 1c show a first exemplary embodiment of the device according to the invention, having a carrier, which can be displaced along an associated conveyor path, for a breast portion of a slaughtered bird, in a first position, a second position and a third position.

In the Figures, arrows without reference numerals indicate possible directions of movement of components.

Figure 1A:
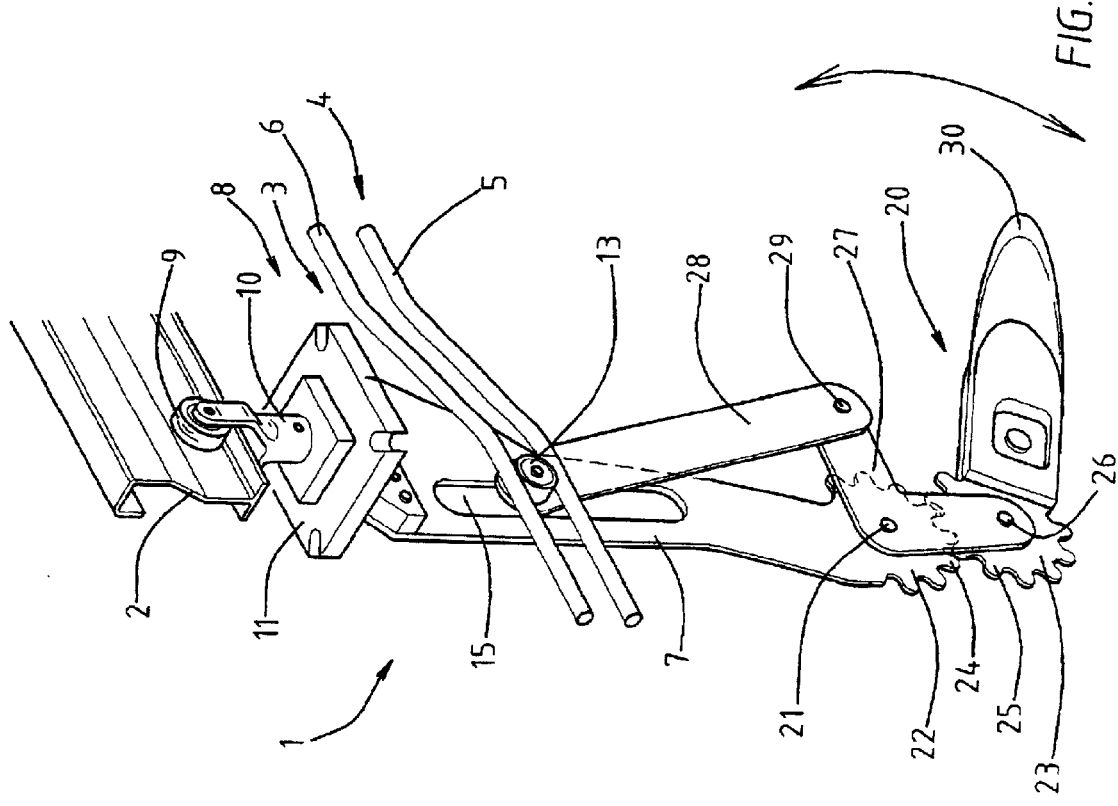
Figure 1C:
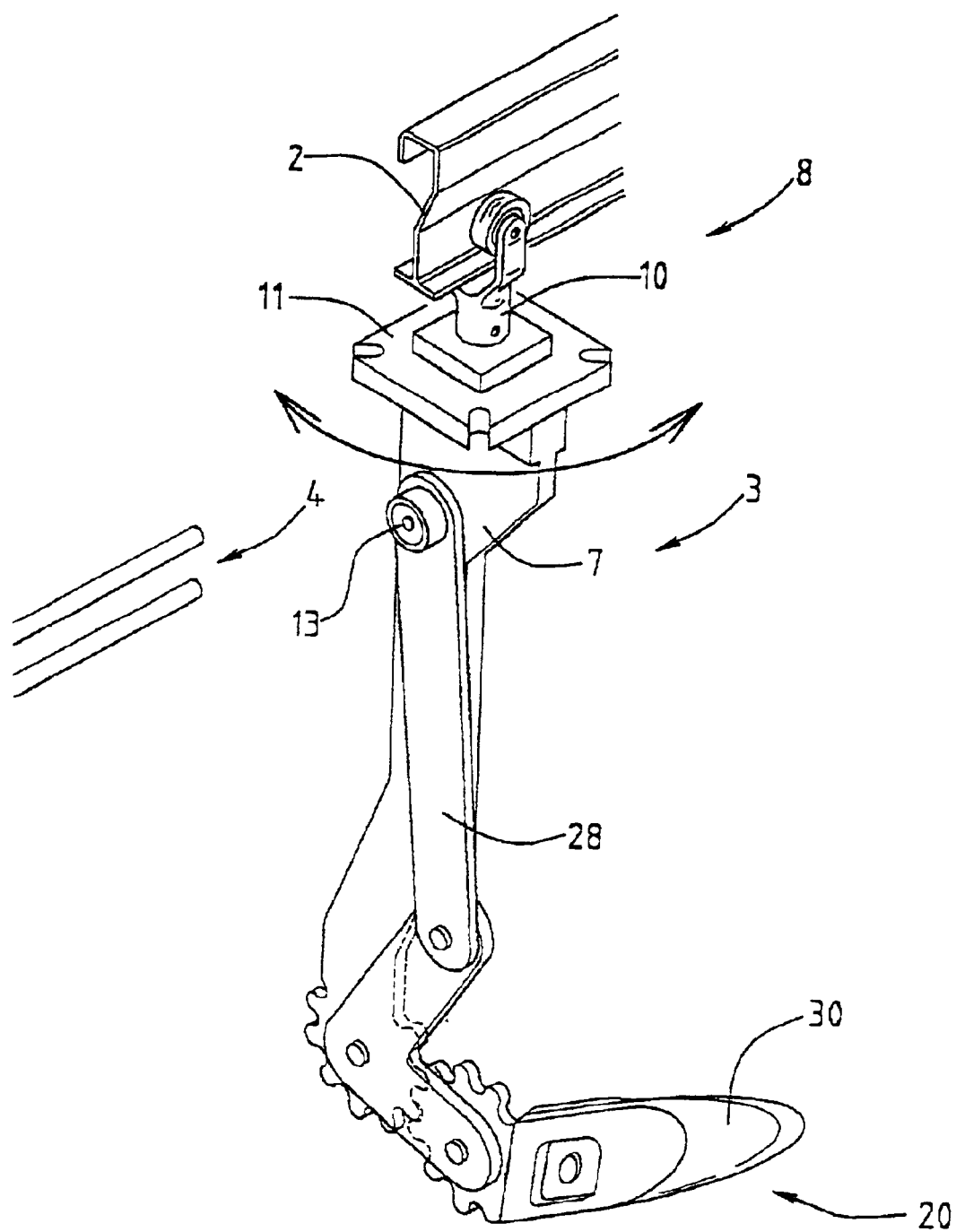

FIGS. 1a, 1b and 1c show part of a device 1 for processing slaughtered poultry according to the invention. The device 1 comprises a first structural component having an immovable rail 2 and a second structural component 3 which can be displaced along the rail 2 by drive means (not shown) and will be described in more detail below.

The first structural component also comprises a stationary cam track 4, which in this case is formed by two rods 5, 6 which lie at a distance from one another in a vertical plane. The cam track 4 extends substantially in the direction of the rail 2 and runs at a varying distance from the rail 2, as can be seen from FIG. 1a.

The second structural component 3 comprises a base body 7 which, via associated coupling means 8, is coupled to the rail 2, so that the base body 7 can be displaced along the rail 2. In this example, the coupling means 8 are designed in such a manner that the base body 7 hangs from the rail 2. The coupling means 8 comprise running wheels 9 which engage on either side of the rail 2 and are accommodated in a common coupling yoke 10. A positioning member 11 is arranged at the bottom end of the coupling yoke 10, in such a manner that it can rotate about a vertical axis, is provided with recesses at the corners and is fixedly connected to the base body 7. The angular position of the positioning member 11 and therefore of the base body 7 can be adjusted with respect to the rail 2 with the aid of actuating means (not shown), such as pins which are arranged along the path of the positioning member 11 and can engage in the recesses in the positioning member. This design of the coupling means 8 and the associated actuating means is already generally known.

The second structural component 3 also comprises a cam-track follower 13, which is in engagement with the cam track 4. It will be clear that, as a result of the angular position of the positioning member 11 being changed, the cam-track follower 13 can also be disengaged from the cam track 4 if this is desired.

The cam-track follower 13 is in this case a mounted roller which fits between the rods 5 and 6 of the cam track 4.

The cam-track follower 13 is guided in such a manner that it can be moved with respect to the base body 7 in an associated vertical plane of movement, by means of a substantially vertically oriented guide slot 15, into which a protrusion connected to the cam-track follower 13 fits.

The second structural component 3 also comprises a rotatable body 20 which is to be described in more detail below and is arranged on the base body 7 in such a manner that it can rotate about an axis of rotation 21. In this case, this axis of rotation 21 is substantially horizontal and therefore at right angles to the substantially vertical plane of movement of the cam-track follower 13.

The bottom section of the base body 7 forms a first rolling body 22, and the adjoining section of the rotatable body 20 forms a second rolling body 23, which rolling bodies 22 and 23 are accommodated in the second structural component 3 in such a manner that they can roll along one another.

In this case, each rolling body 22, 23 defines an associated rolling surface 24, 25 for the other rolling body 23, 22 rolling along it, each rolling surface 22, 23 extending, with an associated radius, in the form of an arc of a circle about a central line 21 and 25 associated with the respective rolling body 22, 23. The central lines 21 and 25 are in this case parallel to one another.

In the design shown in FIGS. 1*a* and 1*b*, each of the rolling bodies 22, 23 is provided, at the location of the associated rolling surface 24, 25, with toothing, by means of which the rolling body 22, 23 is in engagement with the other rolling body 23, 22.

The second rolling body 23, and therefore the rotatable body 20 which is fixedly connected thereto, are connected, via an arm 27, to the base body 7. The arm 27 can rotate about the central line 21 of the first rolling body 22 with respect to the base body 7 and can rotate about the central line 25 of the second rolling body 23 with respect to the second rolling body 23 and therefore with respect to the rotatable body 20.

The cam-track follower 13 is coupled to the arm 27 in such a manner that a movement of the cam-track follower 13 causes a pivoting movement of the arm 27. For this purpose, the cam-track follower 13 is connected, via a coupling rod 28, to a point 29 on the arm 27 which is located at a distance from the central line 21 of the first rolling body 22. In this example, the coupling rod 28 is connected to said point 29 in such a manner that it can pivot about a line parallel to the axis 21.

The rotatable body 20 is designed as a retaining member for retaining part of a slaughtered bird and, in this example, comprises an insertion element 30 onto which a breast portion of a slaughtered bird can be pushed. The insertion element 30 is in this case a sharp component which fits into the breast portion, in such a manner that the breast portion is clamped securely onto it.

Therefore, the device 1 described can be used to move a breast portion along the rail 2. The orientation of the breast portion can be set as desired through the interaction of the cam track 4 and the cam-track follower 13, so that the breast portion can be brought into an orientation which is suitable for a specific treatment or operation. The treatments comprise, for example, fitting the breast portion onto the component 30 or removing the breast portion, while possible operations cover, for example, the execution of cutting operations, treating the breast portion with additives, etc. As stated above, the base body 7 can rotate about a vertical axis with respect to the coupling yoke 10, with the aid of the positioning member 11, which is fixedly connected to the base body 7. In FIG. 1*c*, an arrow indicates that—with the aid of actuating means which are not shown—the angular position of the positioning member 11 and therefore the base body 7 can be set with respect to the rail 2. In this case, the cam-track follower 13 is disengaged from the cam track 4. As a result of this additional direction of movement of the base body 7, the insertion element 30 can execute three-dimensional movements and adopt positions in three dimensions.

In a variant, it is possible to provide locking means which ensure that when the cam-track follower 13 is disengaged from the associated cam track 4, the position of the insertion element 30 which was adopted last is maintained. By way of example, a breast portion can be placed onto or removed from the insertion element 30 in the position shown in FIG. 1*c*. The locking means may, for example, be active between the base body 7 and the rod 28 or between the base body 7 and the arm 27. In a possible design, the locking means comprise a locking pawl which is prestressed by a spring.

In a further variant, it is possible for a second cam-track follower to be arranged on the coupling rod 28, which second cam-track follower is arranged in such a manner that it engages with an associated cam track if the base body 7 has been rotated with respect to its position described above and shown in FIGS. 1–2, so that the cam-track follower 13 is then no longer in engagement with the cam track 4. In this case, that means that the second cam-track follower is oriented at right angles to the first cam-track follower 13. In this way, therefore, actuation and positioning of the rotatable body 20 remains possible even in this rotated position of the base body 7.

FIG. 2 shows a variant of the device 1 shown in FIG. 1, corresponding components being provided with identical reference numerals and modified components being provided with a prime symbol.

The rolling bodies 22' and 23' are not provided with toothed rolling surfaces, but rather with smooth rolling surfaces 24' and 25'. Furthermore, a flexible cord 31 is provided which at one end, at 32, is fixedly connected to rolling body 22' and extends along the associated rolling surface 24' to the point of contact between the two rolling surfaces 24', 25' and, from there, along the rolling surface 25' of the other rolling body 23' to the other end of the cord 31 which, at 34, is fixed to the rolling body 23'. The cord 31 may, for example, be a spring-steel strip. A movement of the cam-track follower 13 results in a pivoting movement of the component 30, as indicated by the arrow in FIG. 2.

Figure 3B:
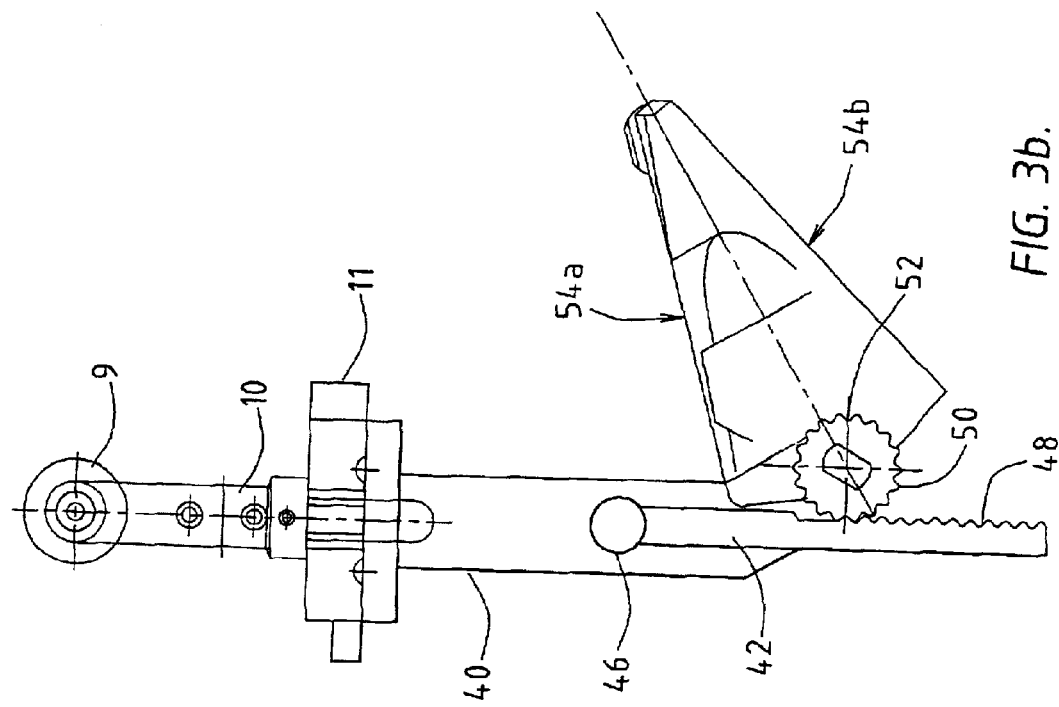
FIGS. 3a and 3b each show a side view of another exemplary embodiment of the device according to the invention, in different operating positions.
Figure 3A:
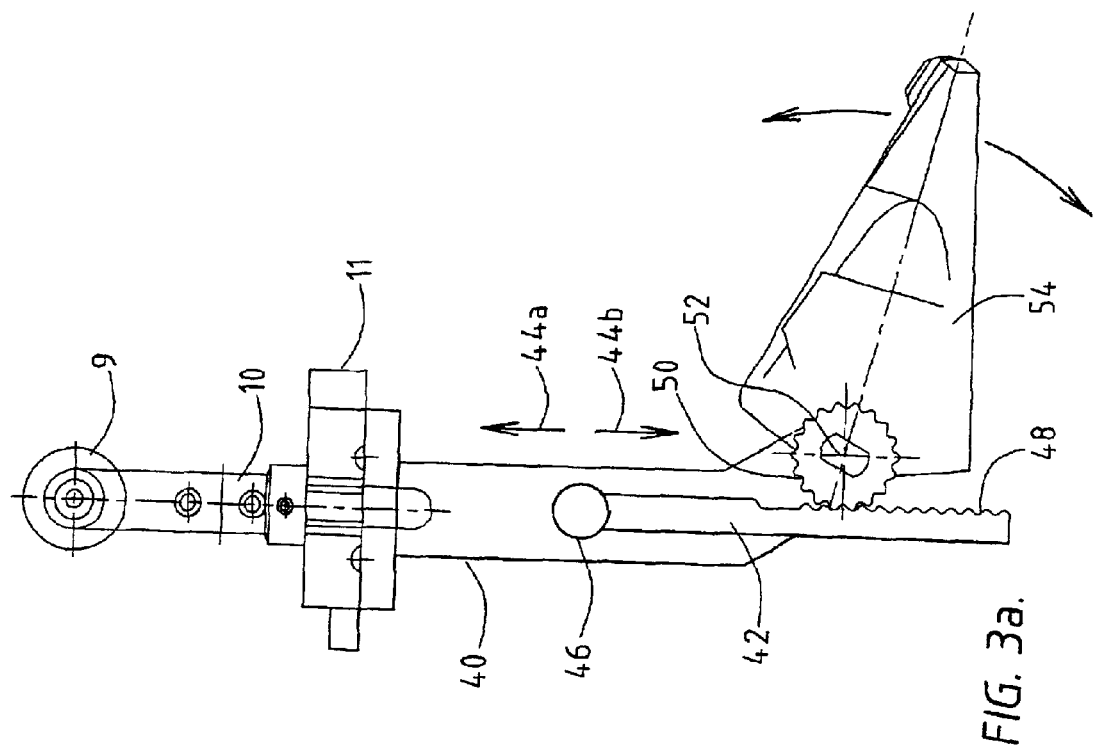

FIGS. 3*a* and 3*b* again show a suspended design of a carrying structure for a slaughter product, having a set of running wheels 9 which is arranged in a common coupling yoke 10. The running wheels 9 are intended to run along a rail 2 which is not shown in more detail. At its bottom end, the coupling yoke 10 is connected, in such a manner that it can rotate about a vertical axis, to a positioning member 11 which, in its corners, is provided with recesses, and is fixedly connected to an angled body 40. A rod 42 is mounted along the angled body 40 in a manner which is not shown in more detail, and this rod can move in the directions of arrows 44*a*, 44*b*. One end of the rod 42 is provided with a cam-track follower 46, such as a freely rotatable roller, which can be guided in a slot, which is not shown in more detail and is formed in the path of the cam-track follower 46, or can be guided through a guide arranged in the path of the cam-track follower 46. One side of the rod 42 is provided with teeth 48 which engage in corresponding teeth of a gearwheel 50, which is fixedly connected to a carrier 54, which can pivot about a shaft 52 with respect to the angled body 40, for a slaughter product (not shown). As illustrated by FIGS. 3*a* and 3*b*, the angular position of the carrier 54 changes when the rod 42 is displaced in the vertical direction, with the result that the free end of the carrier 54, in one limit position, can be directed obliquely upwards as shown in FIG. 3*b* (in which one side 54*a* of the carrier 54 is directed upwards) and, in another limit position—after the rod has been displaced in the direction of the arrow 44*a*— can be rotated through more than 180 degrees in the clockwise direction, and is then once again directly obliquely upwards (with a side 54b of the carrier 54 facing upwards).

Figure 4:
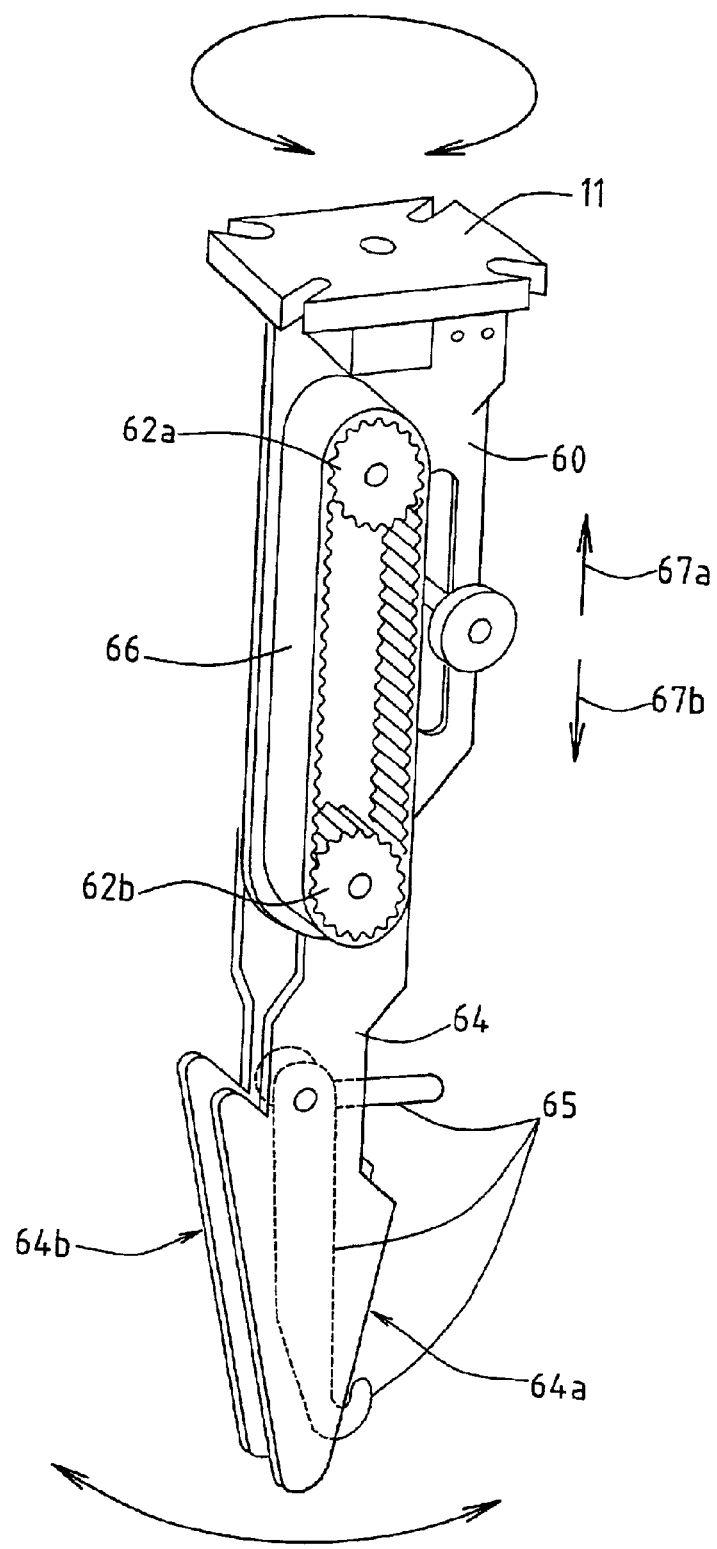
FIG. 4 shows a perspective view of yet another exemplary embodiment of the device according to the invention.

FIG. 4 shows a positioning member 11 which, in this and subsequent Figures, although not shown, can be rotatably connected to a coupling yoke 10 provided with running wheels 9 as shown in previous figures. The positioning member 11 is fixedly connected to a body 60 on which two, preferably toothed, wheels 62a, 62b are rotatably mounted. The wheel 62b is fixedly connected to a carrier 64 for a slaughter product which is not shown but is fixed to the carrier 64 with the aid of fixing means 65. An endless, preferably toothed, belt 66, which at a location along its circumference is fixedly connected to a cam-track follower 68 which can move in the directions of arrows 67a, 67b, is wrapped around the wheels 62a, 62b. In the event of the cam-track follower 68 being displaced in the direction of arrow 67a, the wheel 62b rotates anticlockwise, and one side 64a of the carrier 64 is ultimately turned upwards. If the cam-track follower 68 is displaced in the direction of arrow 67b, the wheel 62b rotates clockwise, and a side 64b of the carrier 64 is ultimately turned upwards.

Figure 5A:
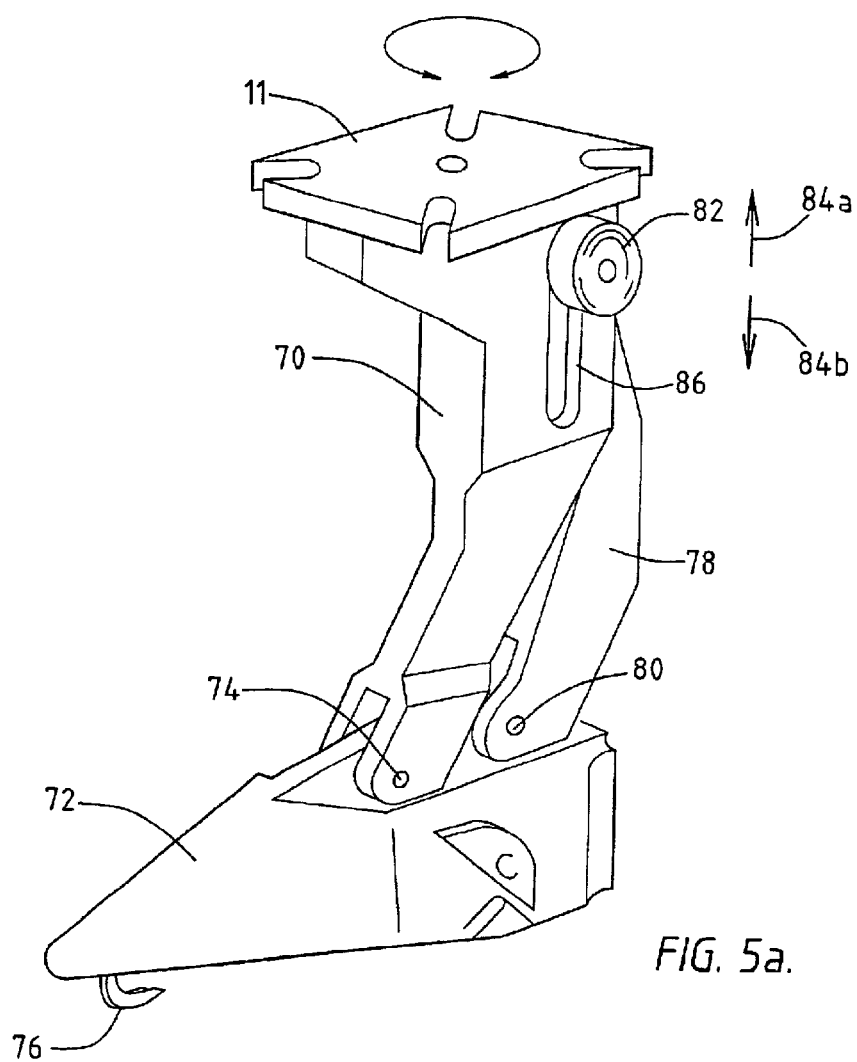
FIG. 5a shows a perspective view of yet another exemplary embodiment of the device according to the invention.
Figure 5B:
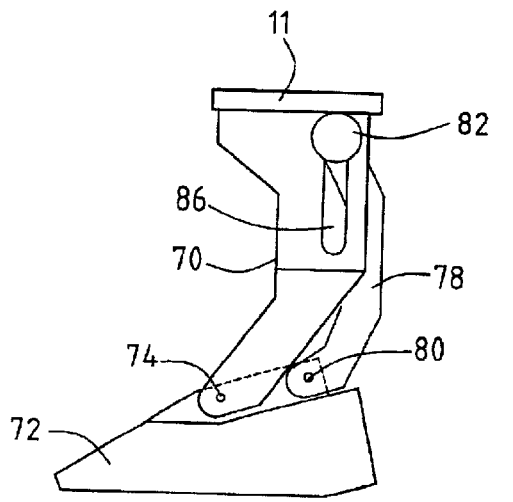
FIGS. 5b and 5c show side views of the exemplary embodiment of FIG. 5a, in different operating positions.
Figure 5C:
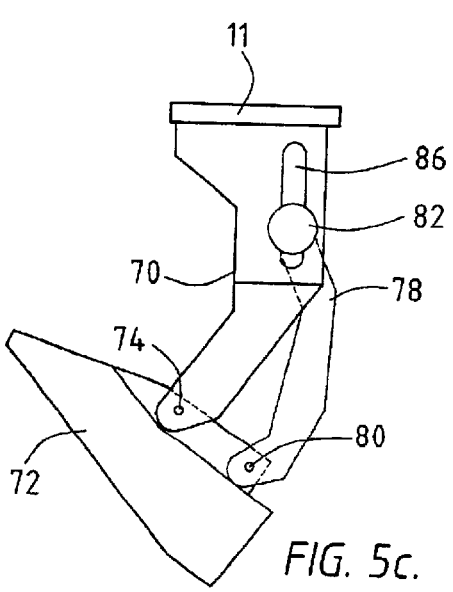

FIGS. 5a, 5b and 5c show a positioning member 11 which is fixedly connected to a body 70. A carrier 72 is connected to the body 70 in such a manner that it can pivot about a horizontal shaft 74. The carrier 72 is provided with fixing means 76 (not shown in more detail here) for fixing a slaughter product (not shown) to the carrier 72. At one end, an actuating rod 78 is connected to the carrier 72 in such a manner that it can pivot about a shaft 80, while at the other end it is connected to a cam-track follower 82 which is guided in a groove 86 in the body 70 in such a manner that it can move in the vertical direction as indicated by arrows 84a, 84b. When the cam-track follower 82 is situated at the top end of the groove 86, the carrier 72 adopts the angular position shown in FIG. 5b. When the cam-track follower 82 is displaced downwards in the direction of the arrow 84b, the carrier 72 pivots in the clockwise direction, as illustrated by FIG. 5c.

Figure 6A:
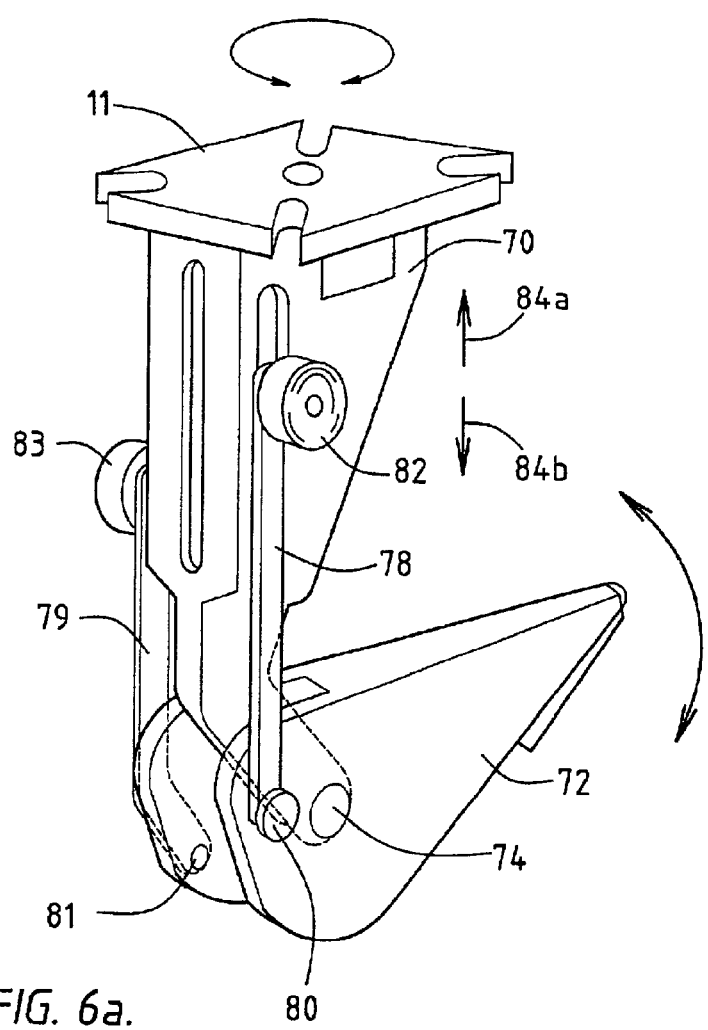
FIG. 6a shows a perspective view of yet another exemplary embodiment of the device according to the invention.
Figure 6B:
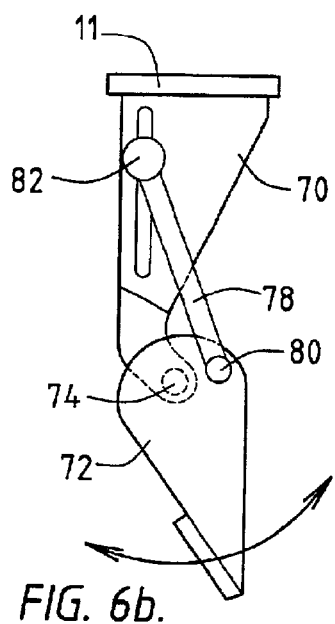
FIGS. 6b and 6c show side views of the exemplary embodiment of FIG. 6a, in different operating positions.
Figure 6C:
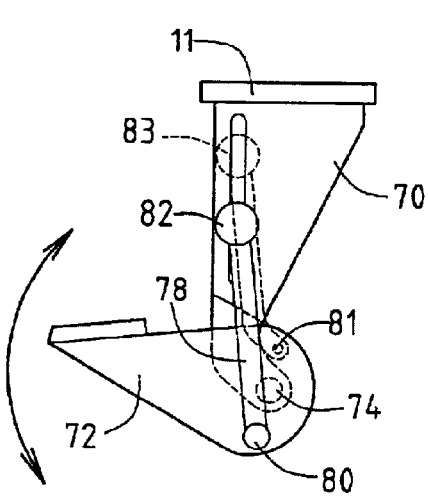

FIGS. 6a, 6b and 6c substantially show a variant of the embodiment shown in FIGS. 5a–5c, and consequently similar components bear identical reference numerals. However, compared to FIGS. 5a–5c, in FIGS. 6a–6c a second actuating rod 79 having a second cam-track follower 83 is added, the rotatable connection of which to the carrier 72 via a shaft 81 is arranged at a different angular position with respect to the shaft 74 from that of the shaft 80 with respect to the shaft 74. As a result, it is possible to rotate the carrier 72 in a controllable and defined manner through more than 180 degrees, without movement of the cam-track follower 82 out of a dead centre position in the crankshaft mechanism formed by the rod 78 and the carrier 72 leading to the angular position of the carrier 72 becoming undefined, since the crankshaft mechanism formed by the rod 79 and the carrier 72 is then not in a dead centre position, and defines the angular position. Conversely, the crankshaft mechanism comprising the rod 78 is not in a dead centre position when the crankshaft mechanism comprising the rod 79 is in a dead centre position, so that in this case too, the angular position of the carrier 72 remains clearly defined.

Figure 7A:
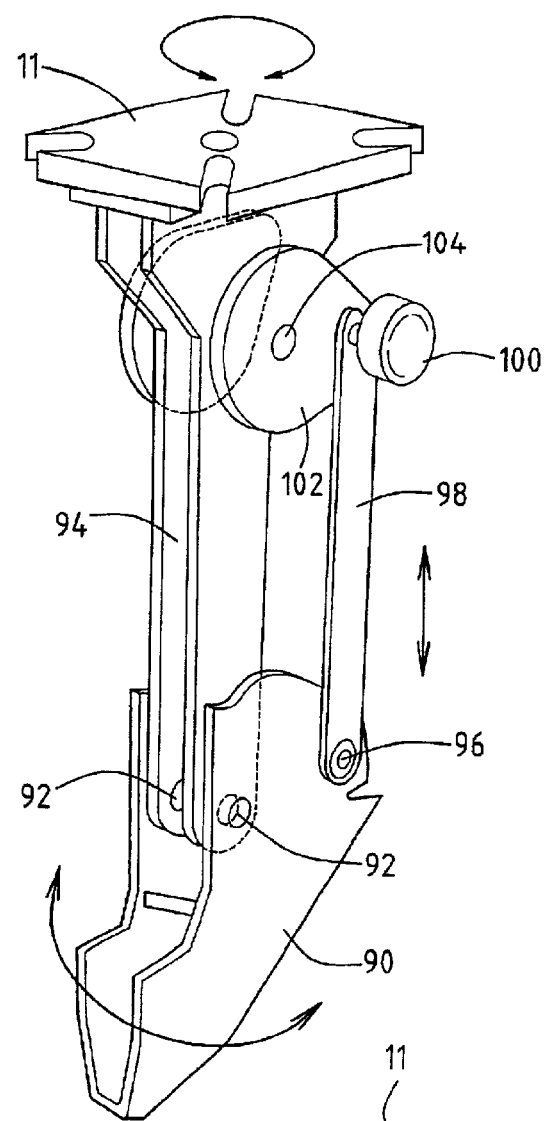
FIG. 7a shows a perspective view of a further exemplary embodiment of the device according to the invention.
Figure 7B:
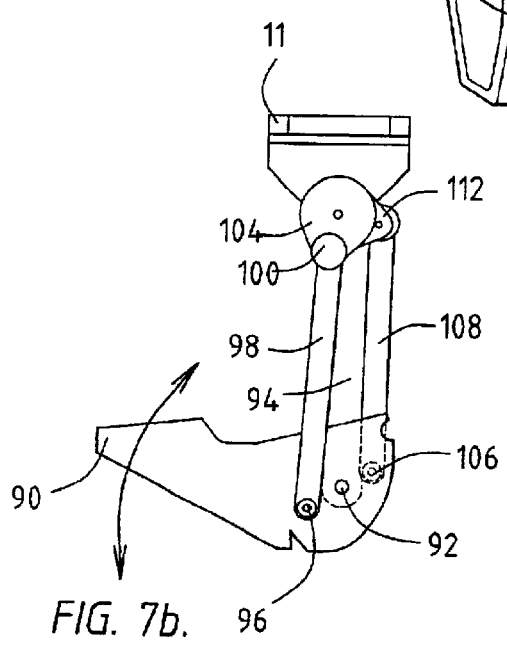
FIGS. 7b and 7c show side views of the exemplary embodiment of FIG. 7a, in different operating positions.
Figure 7C:
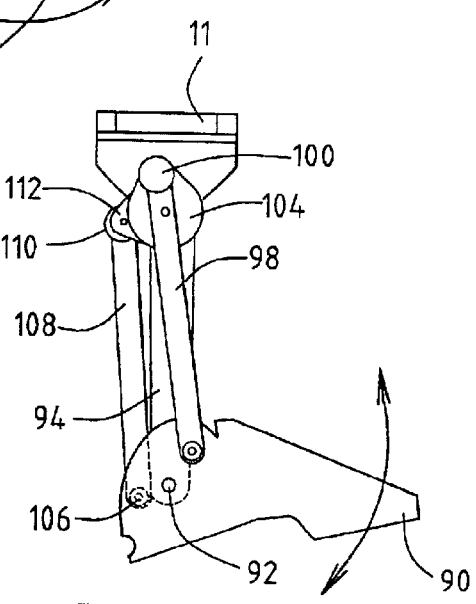
Figure 8A:
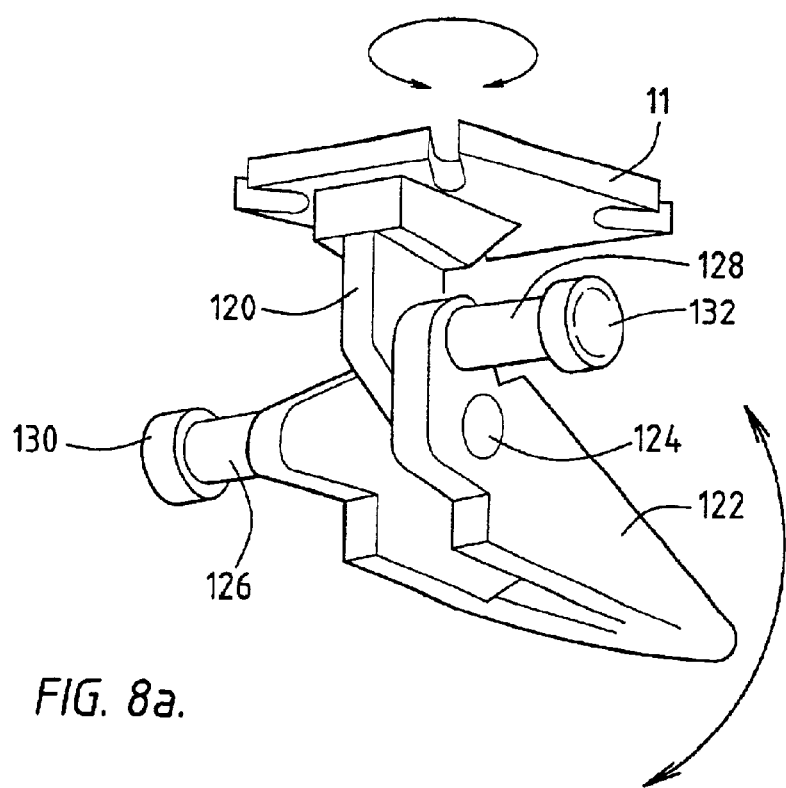
FIG. 8a shows a perspective view of a further exemplary embodiment of the device according to the invention.
Figures 8B, 8C, 8D:
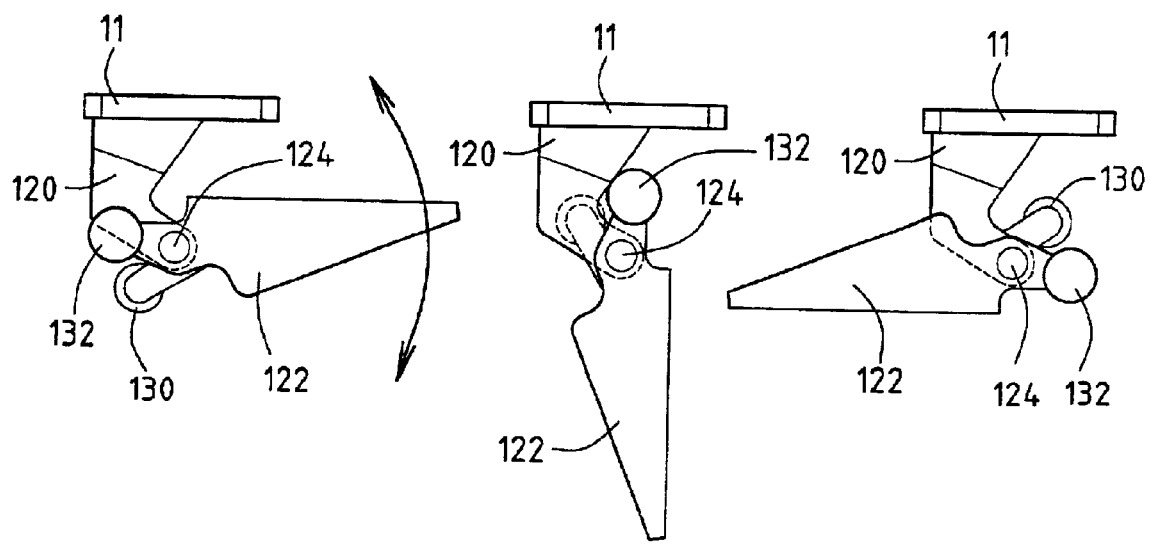
FIGS. 8b, 8c and 8d show side views of the exemplary embodiment of FIG. 8a, in different operating positions.

FIGS. 7a, 7b and 7c show a similar exemplary embodiment to that shown in FIGS. 6a–6c, except that the actuating means for varying the angular position of a carrier 90 are of different design. The carrier 90 is connected, in such a manner that it can pivot about a shaft 92, to a single-part or multipart elongate body 94 which is fixedly connected to a positioning member 11. At a distance from the shaft 92, the carrier 90 is connected, in such a manner that it can pivot about a shaft 96, to an arm 98 which, at the end remote from the carrier 90, bears a cam-track follower 100. The cam-track follower 100 is rotatably connected to a plate 102 which is mounted on the body 94 in such a manner that it can pivot freely about a shaft 104. In addition, the carrier 90 is connected to an arm 108 in such a manner that it can pivot about a shaft 106, the projection of the shaft 96 onto a vertical plane lying at a different angle with respect to the shaft 92 from the projection of the shaft 106 onto the said vertical plane. At the end which is remote from the carrier 90, the arm 108 bears a cam-track follower 110 which is pivotably connected to a plate 112 which, in turn, is connected to the body 94 in such a manner that it can pivot freely about the shaft 104. As a result of the cam-track followers 100 and 112 being guided in suitable guide slots (not shown) while the device is being conveyed, the orientation of the carrier 90 can be set accurately, in particular about a dead centre position of a crankshaft structure which is formed by the carrier, arms 98 and 108 and plates 102 and 112. A dead centre position of this nature for the crank shaft structure of which the arm 98 forms part is shown in FIG. 7b. The crankshaft structure of which the arm 108 forms part can in this situation ensure definite pivoting of the carrier 90 in a predetermined direction.

FIGS. 8a, 8b, 8c and 8d show a positioning member 11 which is fixedly connected to a body 120. A carrier 122 is connected to the body 120 in such a manner that it can pivot about a shaft 124. Laterally projecting arms 126, 128, which each bear a cam-track follower 130 and 132, respectively, are arranged on the carrier 122, in different angular position with respect to the shaft 124. The cam-track followers 130 and 132 are preferably mounted in a freely rotatable manner on the arms 126 and 128, respectively. In contrast to the devices shown in FIGS. 6a–6c and 7a–7c, crankshaft mechanisms are not used in the device shown in FIGS. 8a–8d, while in this exemplary embodiment it is also possible, with the aid of the cam-track followers 130, 132, to set a defined angular position of the carrier 122 around the shaft 124, despite the occurrence of a dead centre position during the vertical displacement of one of the cam-track followers 130, 132 in an associated slot during displacement of the device, as can be seen from FIGS. 8b–8d.

FIGS. 9a and 9b show a positioning member 11 which, via bolt connections 134, is fixedly connected to a single-part or multipart body 136. A carrier 138 is connected to the body 136 in such a manner that it can pivot about a shaft 140. A wheel 142 is fixedly connected to the carrier 138 and can also rotate about the shaft 140. A second wheel 144 is mounted in the body 136 in such a manner that it can rotate about a shaft 146. An endless belt 148 is wrapped around the wheels 142, 144, in such a manner that a rotation of the wheel 144 leads to a proportional rotation of the wheel 142 and pivoting of the carrier 138 about the shaft 140. A set of cam-track followers 150 is fixedly connected to the belt 148 via a shaft 152 which is guided in a groove 154 in the body 136. When the cam-track followers 150 are displaced from the position shown in FIGS. 9a and 9b to a position at the top end of the grooves 154, as seen in the figures, the carrier 138 pivots about the shaft 140, from the position shown in FIG. 9b, through more than 200° in the clockwise direction. For this purpose, one of the cam-track followers 150 or both cam-track followers 150 is/are displaced in a suitable guide slot (not shown) of a guide element (also not shown), substantially in the horizontal direction. Moreover, the device shown in FIGS. 9a and 9b has a cam-track follower 156 which is arranged on a shaft 158, which is fixedly connected to the belt 148, in such a manner that it can rotate freely. The presence of the cam-track followers 150, on the one hand, and the cam-track follower 156, on the other hand, makes it possible to pivot the carrier 138 about the shaft 140 in angular positions of the device which differ from one another by 90° (as seen with regard to a vertical axis), using identical or similar guide slots in guide elements which are arranged stationary along a path of the device shown in FIGS. 9a and 9b.

Figure 10:
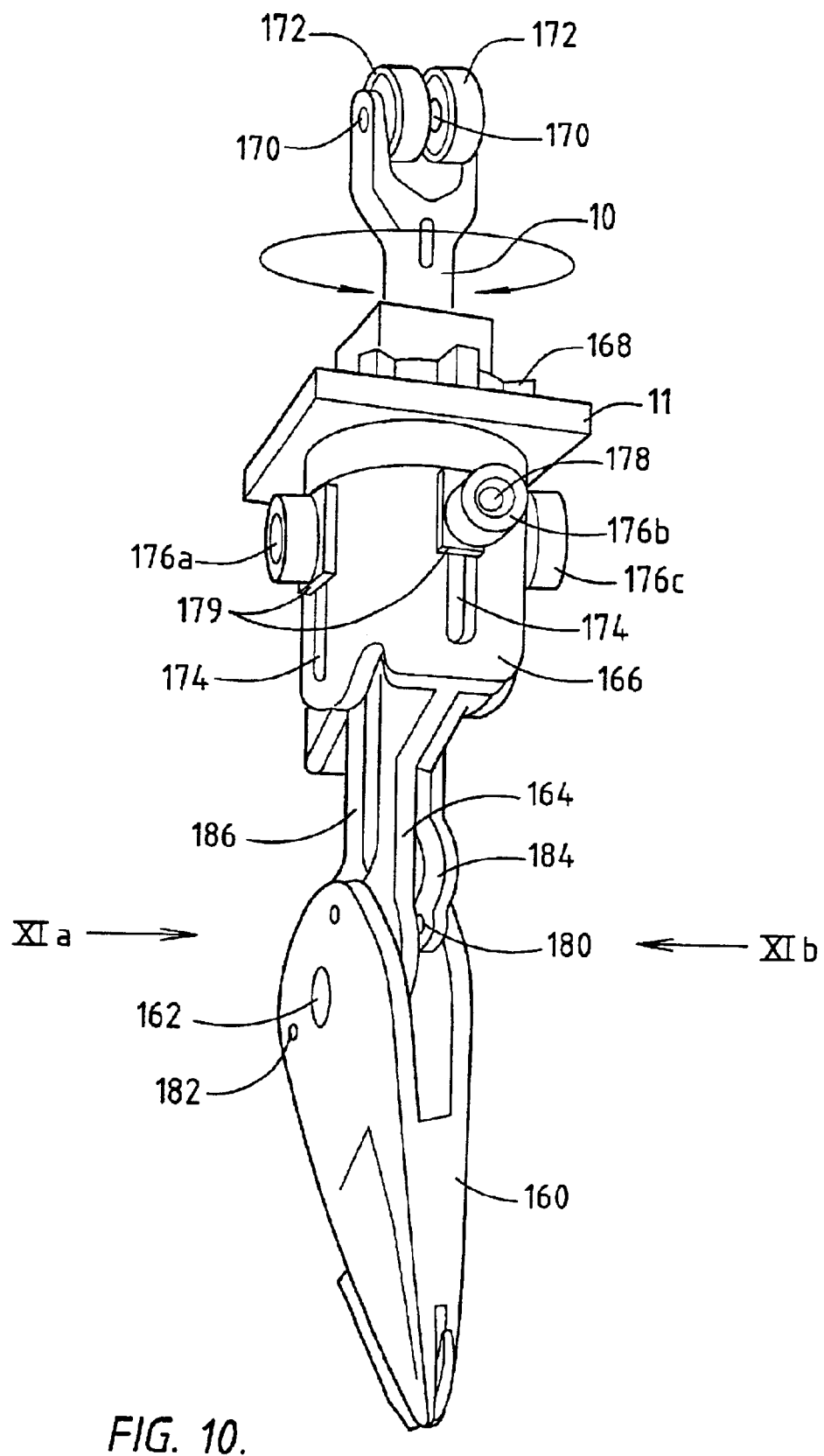
FIG. 10 shows a perspective view of a further exemplary embodiment of the device according to the invention.
Figures 11A, 11B:
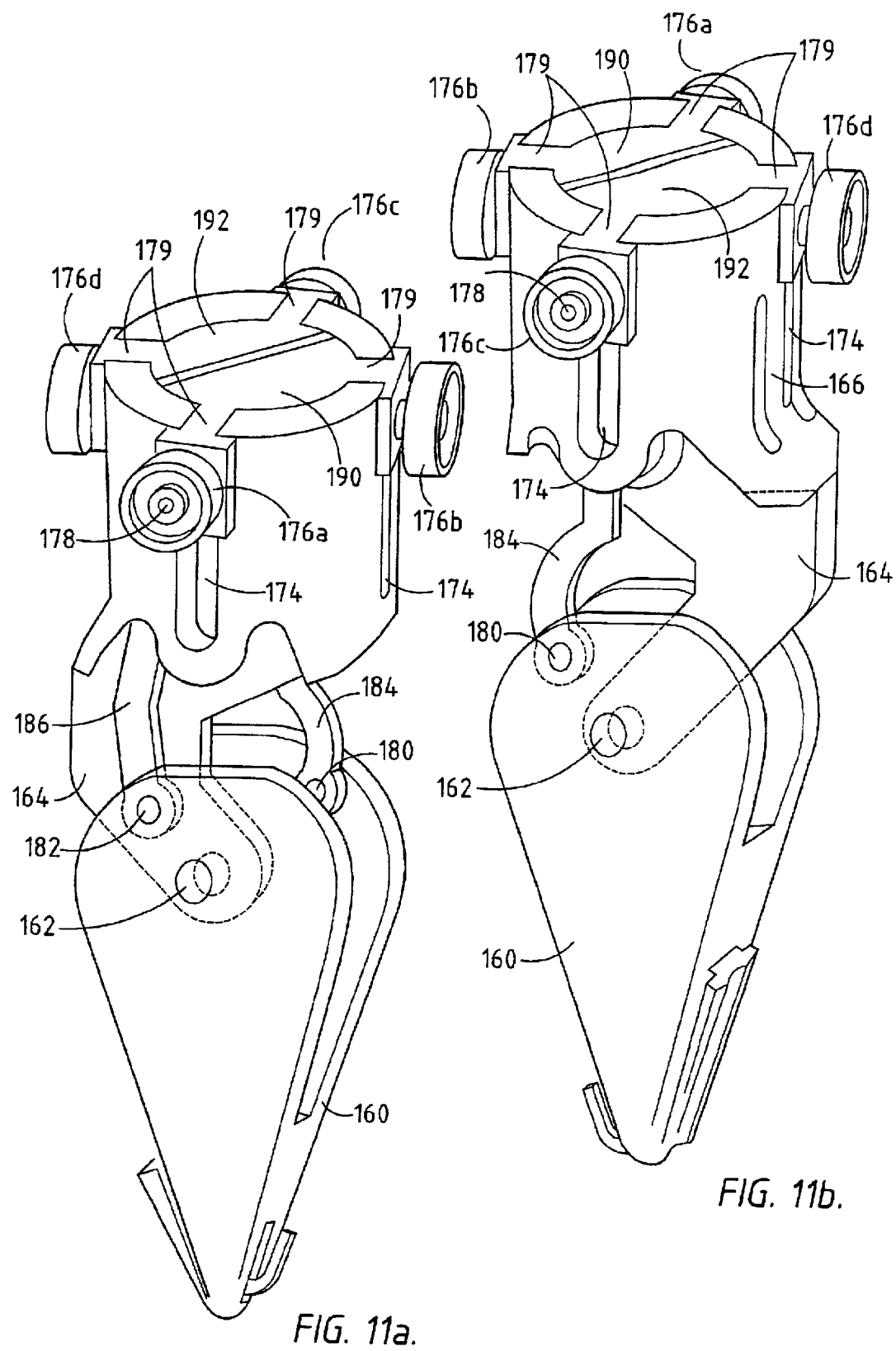
FIGS. 11a and 11b show perspective views of part of the device shown in FIG. 10, according to the arrows XIa and XIb, respectively.
Figures 12A, 12B:
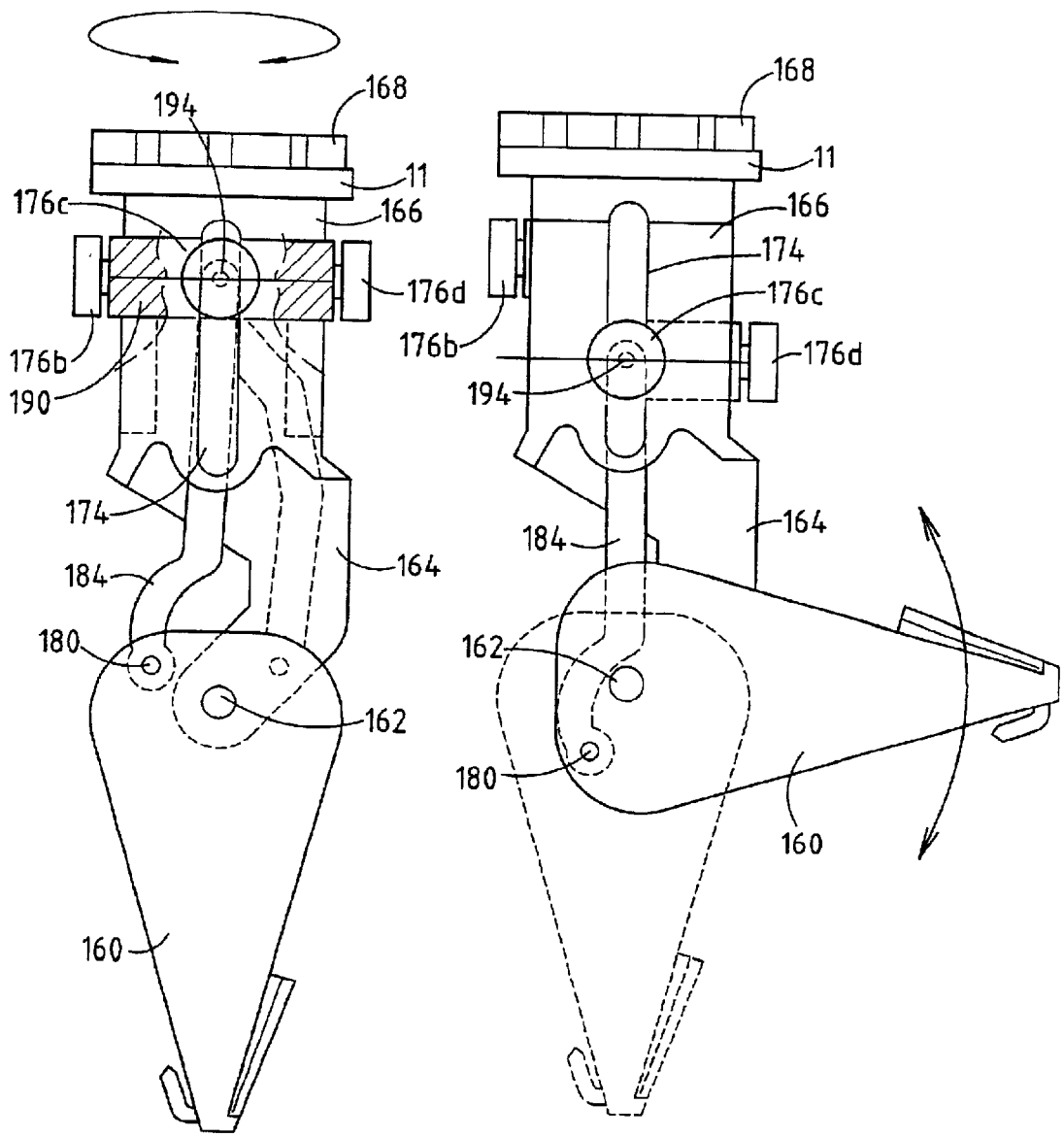
FIGS. 12a and 12b show side views of the exemplary embodiment shown in FIG. 10, in different operating positions.
Figures 13A, 13B:
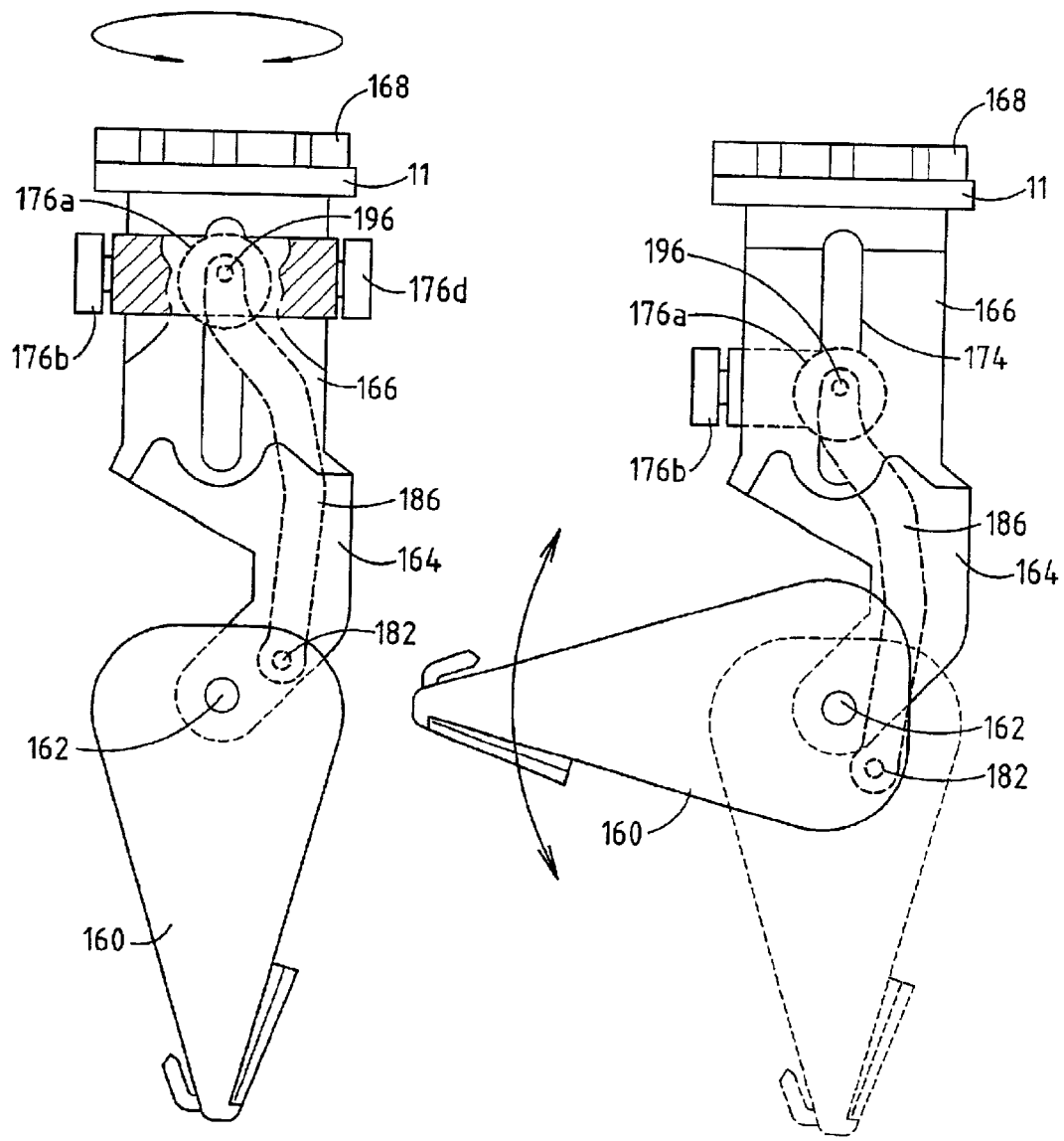
FIGS. 13a and 13b show other side views of the exemplary embodiment of FIG. 10, in different operating positions.

FIG. 10 shows a carrier 160 which is connected to an arm 164 of a body 166 in such a manner that it can pivot about a shaft 162. A positioning member 11 is fixedly connected to the body 166, as well as a gearwheel 168. The assembly comprising the body 166, the positioning member 11 and the gearwheel 168 is connected to a coupling yoke 10 in such a manner that it can rotate about a vertical axis. The coupling yoke 10 has a fork-shaped end which bears two wheels 172 which can rotate freely about shafts 170 and are intended to run along flanges of a rail (not shown in more detail), for example the rail 2 which is shown in FIGS. 1a–1c.

If appropriate, a universal joint may be incorporated in the connection between the coupling yoke 10 and the elements situated below it, so that these elements can orient themselves freely as directed by the force of gravity, in particular if the rail is oriented not horizontally, but rather sloping upwards or downwards. Naturally, if the said universal joint is used, the said elements can also be placed in a defined inclined position with respect to the coupling yoke 10, by means of a guide or the like situated in the path of these elements, in order to facilitate an operation to be carried out on a slaughter product or in fact to avoid this operation.

The body 166 is provided with four slots 174, in which protrusions 179, which are coupled to wheels 176a, 176b, 176c and 176d (not visible in FIG. 10) and are provided with shafts 178, are guided. The carrier 160 is connected to arms 184 and 186 in such a manner that it can pivot about shafts 180 and 182, respectively, which arms are in turn coupled to the wheels 176a–176d in a manner which will be made clear with reference to the following figures.

FIGS. 11a, 11b, 12a, 12b, 13a and 13b show further details of the device shown in FIG. 10. It can be seen from these figures that the body 166 is provided on the inside with a substantially cylindrical hollow space, in which two coupling bodies 190, 192, which are in the shape of half a cylinder, are arranged. The protrusions 179 of the wheels 176a and 176b are connected to the coupling body 190, while the protrusions 179 of the wheels 176c and 176d are connected to the coupling body 192.

FIGS. 12a, 12b, 13a and 13b illustrate the coupling, which can pivot about a shaft 194 or 196, between the arm 184 or 186, respectively, and the coupling body 192 or 190, respectively. As illustrated in particular by FIGS. 12a and 12b, the carrier 160 pivots in the anticlockwise direction about the shaft 162 in the event of a downwards movement of one or both of the wheels 176c and 176d, due to the pivotable coupling between the shafts 180 and 194, which is formed by the arm 184. As illustrated in particular by FIGS. 13a and 13b, the carrier 160 pivots in the clockwise direction about the shaft 162 in the event of downwards movement of one or both of the wheels 176a and 176b, as a result of the coupling of the shafts 182 and 196 via the arm 186.

Figure 14:
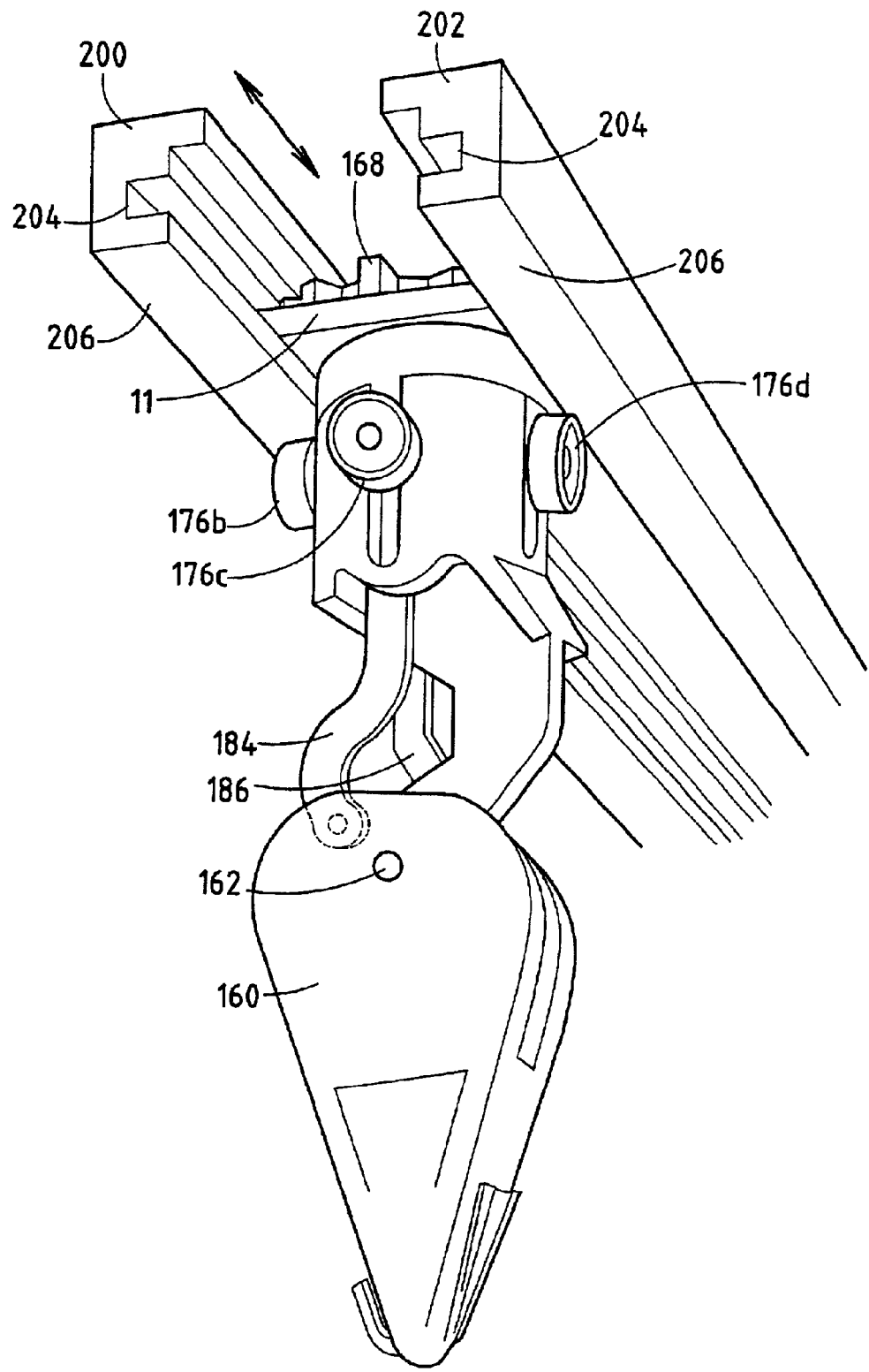
FIG. 14 shows a perspective view of the exemplary embodiment shown in FIG. 10, in a guide.

FIG. 14 shows the device illustrated in FIGS. 10, 11a–13b, held between lateral guide rails 200, 202 which are provided with guide slots 204, lying opposite one another, for guiding the positioning member 11 at its edges. As a result of the bottom sides 206 of the lateral guide rails 200, 202 being brought into contact with one of the wheels 176b or 176d as a result of the variation in the distance between the slot 204 and the bottom side 206, it is possible to vary the pivoted position of the carrier 160 between the position shown in FIG. 12b and the position shown in FIG. 13b, during displacement of the device in the longitudinal direction of the guide rails 200, 202.

Figure 15A:
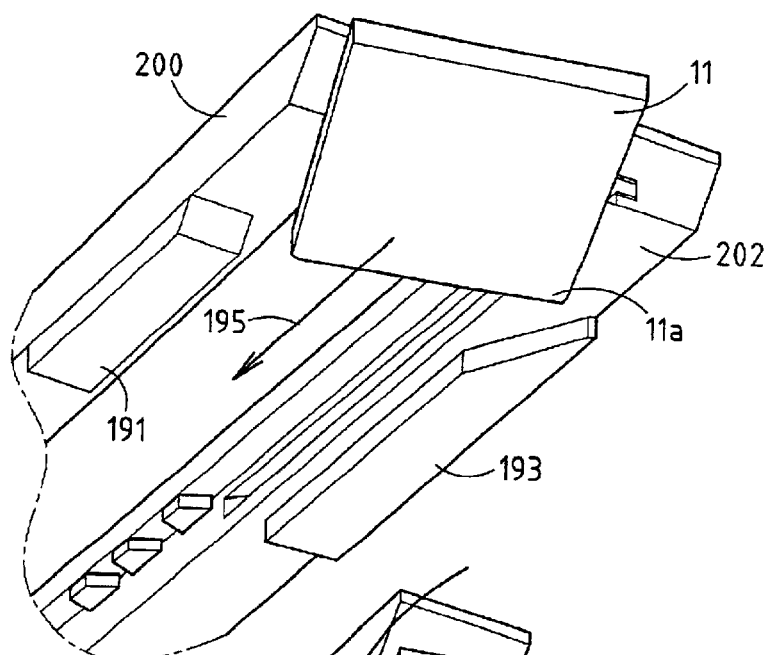
FIGS. 15a–15c show perspective views of a positioning member of a first body and actuating means which interact therewith, in various positions of the positioning member.
Figure 15B:
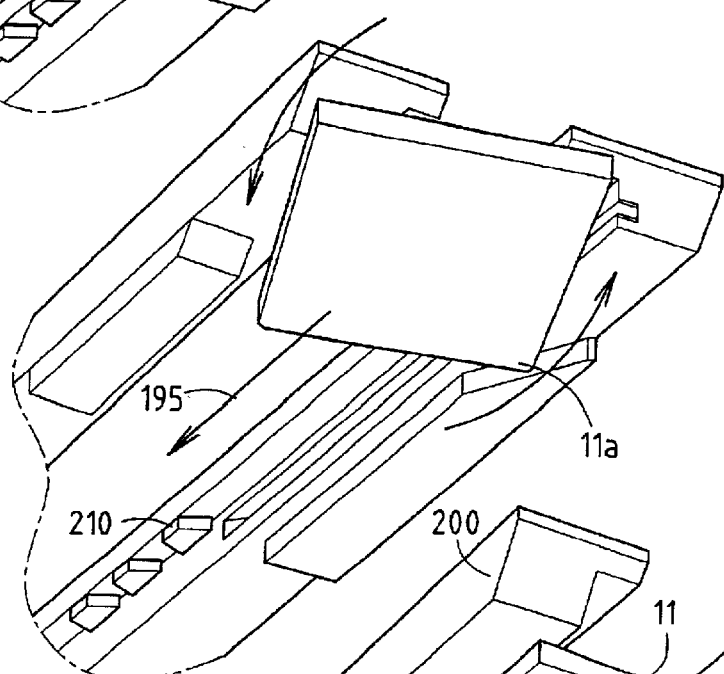
Figure 15C:
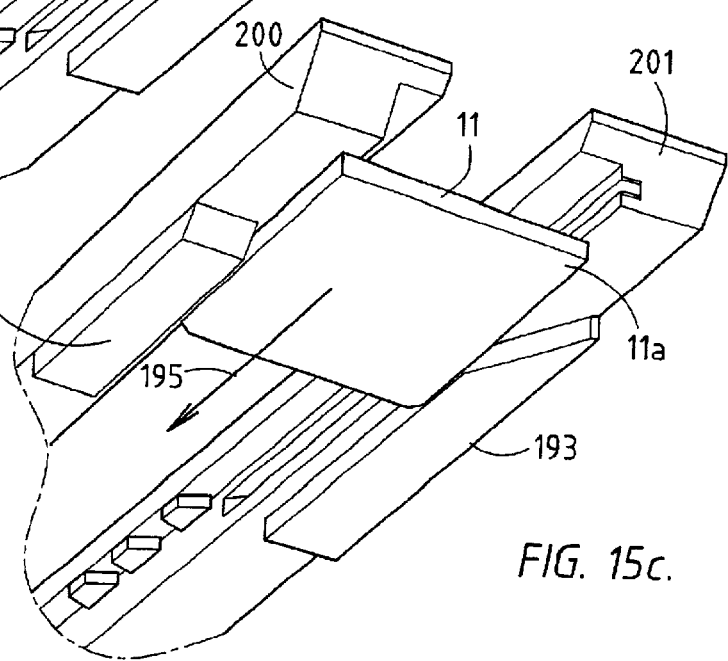

FIGS. 15a–15c show the bottom side of the guide rails 200, 202 along which a positioning member 11 of a first body moves. For the sake of clarity, the remaining section of the first body has been omitted. On its bottom side, the guide rail 200 is provided with a first guide protrusion 191, while the guide rail 202 is provided with a second guide protrusion 193 on its bottom side. The distance between the guide protrusions 191 and 193 substantially corresponds to the length of one side of the (square) positioning member 11, so that the positioning member 11 can pass between the two guide protrusions 191 and 193 when two sides of the positioning member 11 are oriented substantially parallel to the guide protrusions 191, 193. If this is not the case and the positioning member 11 moves in the direction of arrow 195, as illustrated in FIG. 15a, a projecting corner 11a will hit a sloping side of a second guide protrusion 193. This is illustrated in FIG. 15b, which also indicates that the positioning member 11, when it continues to move in the direction of the arrow 195, will begin to rotate into a position shown in FIG. 15c, after which the positioning member 11 can pass between the guide protrusions 191, 193 in one of four possible angular positions.

FIG. 15d shows the gearwheel 168 in more detail. The gearwheel 168 comprises eight teeth 168a–168h, the tooth 168a being active over only a section of its height, since a section of the tooth is missing. The tooth 168h is also active over only a section of its height; above it there is a blocking protrusion 169, the function of which will be explained in more detail below with reference to FIGS. 15e and 15f.

As illustrated by FIG. 15e, in the event of displacement of the device in the direction indicated by arrow 208 along a gear rack 210 which is arranged stationary and is provided with teeth which engage on the teeth of the gearwheel 168, the gearwheel 168, and therefore also the body 166, will rotate about a vertical axis 212 through a predetermined angle, as illustrated by dashed lines in FIG. 15e. In this way, the angular position of the carrier 160 can be changed. It should be noted that in FIG. 15e only one guide rail 205 is illustrated, for the sake of clarity, while an opposite guide rail has been omitted. It should also be noted that the gear rack 210 only acts on the top section of the teeth 168b–168g, i.e. that section of these teeth which extends above the level of the tooth 168a.

As rotation of the gearwheel 168 about the axis 212 continues, in the end the position shown in FIG. 15f is reached, in which the blocking protrusion 69 comes into contact with the teeth of the gear rack 210. In this way, a clearly defined starting position of the gearwheel 168 is reached. In the event of further movement of the body 166 in the direction of the arrow 208, the blocking projection 169 slides along the teeth of the gear rack 210.

Figure 15G:
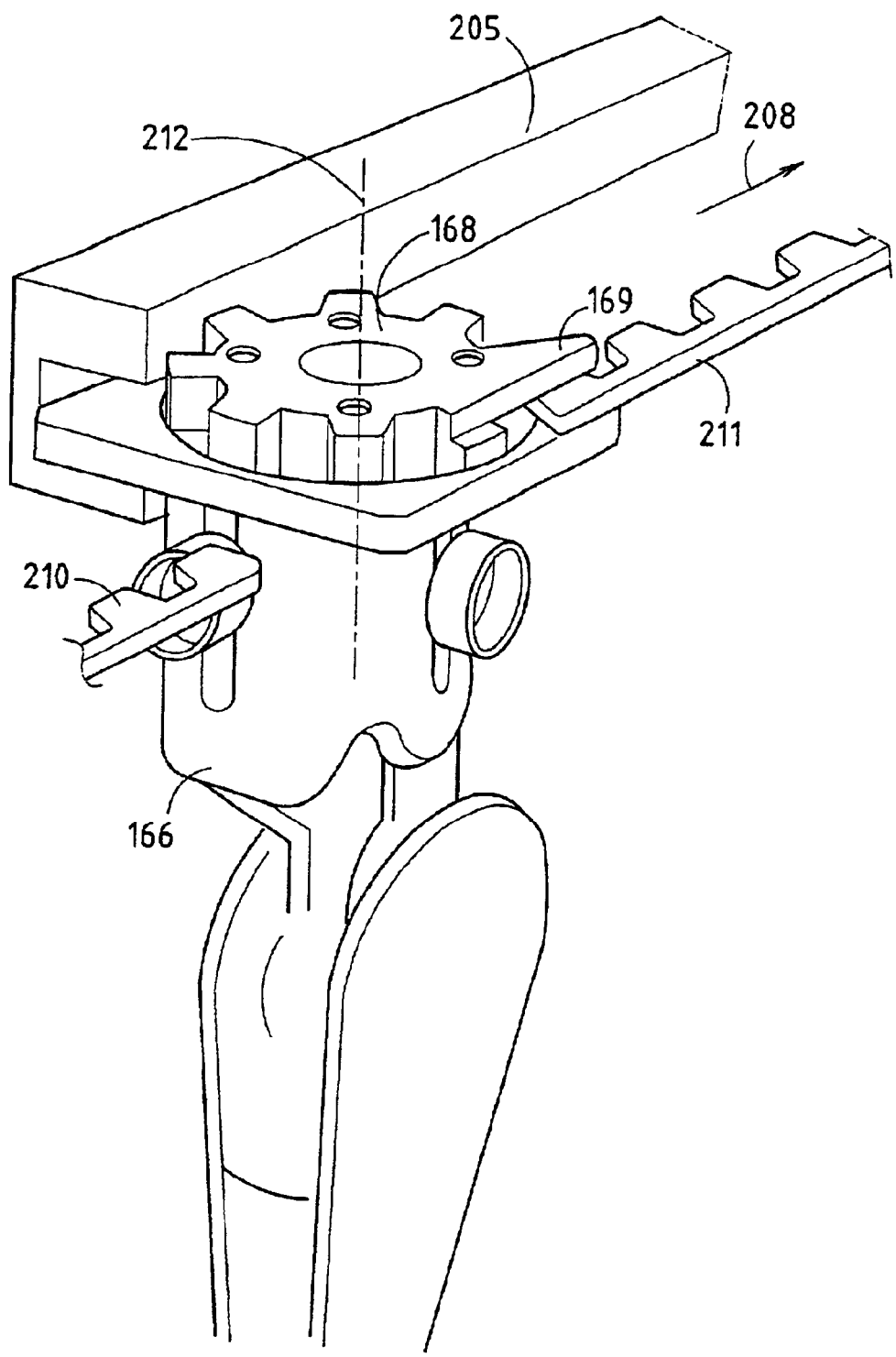
FIG. 15g shows a perspective view of the way in which a first and a second toothed structure operate.

FIG. 15g illustrates how the gearwheel 168, after it has left the gear rack 210, is guided along a second gear rack 211 which is arranged stationary and the teeth of which engage on that section of the teeth of the gearwheel 168 which is situated below the level of the blocking protrusion 169. By selecting the number of teeth of the gear rack 211, it is possible to set a predetermined angular position of the body 166 about the axis 212 from the starting position of the body 166 which is brought about with the aid of the gear rack 210.

In view of the fact that the gearwheel 168 comprises eight teeth 168a–168h which are arranged at regular intervals along the circumference, each tooth of the rack 211 corresponds to a rotation of the gearwheel 168, and therefore of the body 166, through 45°.

Figure 15H:
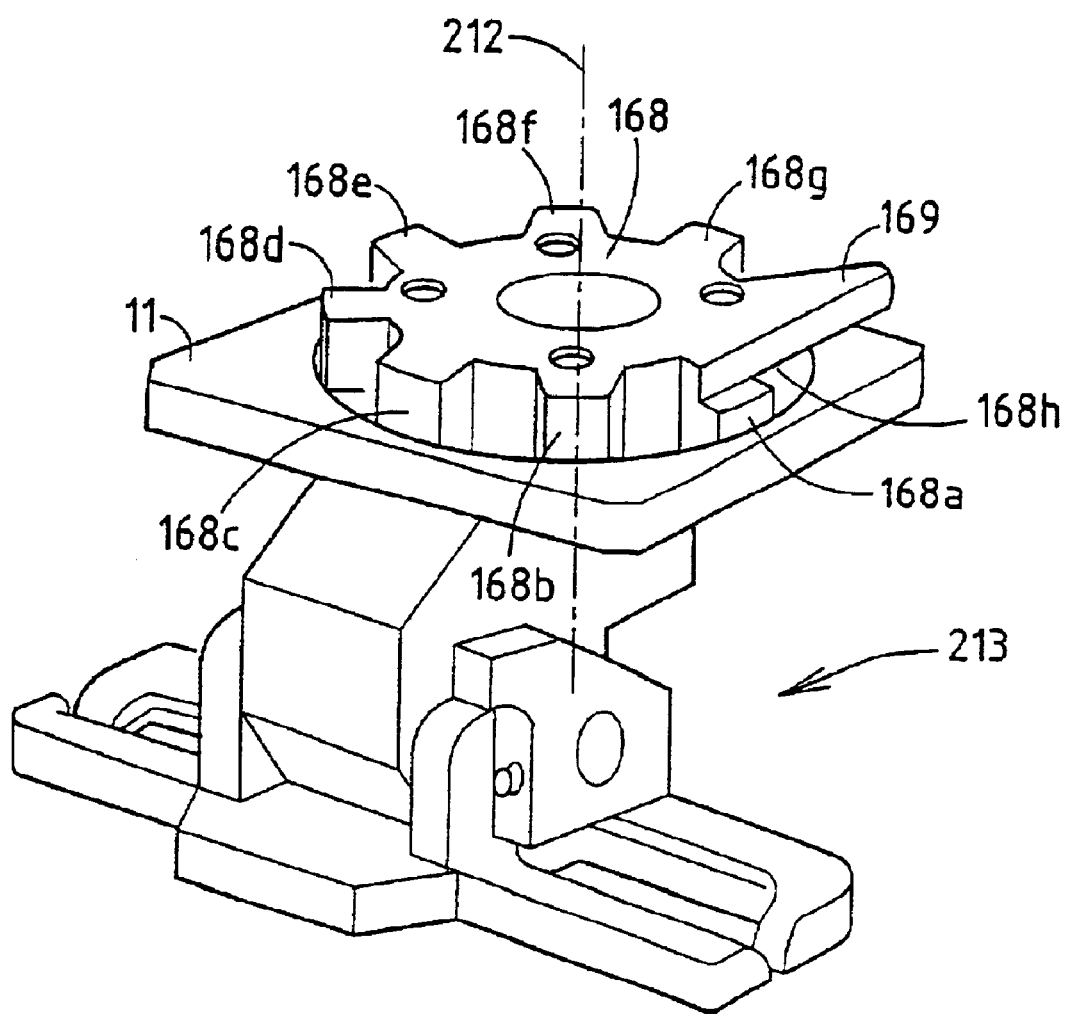
FIG. 15h shows a slaughter product carrier provided as shown in FIG. 15e.

FIG. 15h illustrates the use of the gearwheel 168 with a double hook 213 for carrying a slaughter product, which hook 213 is known per se from the prior art. The combination of the gearwheel 168 and the hook 213 make it possible to move the hook into a clearly defined angular position with respect to the axis 212 with the aid of suitable first actuating means.

FIG. 16 illustrates the way in which first and second actuating means operate, on the basis of three devices as shown in FIGS. 10–15 moving in the direction of arrow 220. The devices are moved along guide rails which are shown in more detail in FIG. 14. For this purpose, the devices are provided with a coupling yoke 10 (not shown) and are suspended from a rail 2 which is arranged above and substantially parallel to the guide rails 200, 202. The coupling yokes 10 of the various devices are coupled to one another by means of a driven chain or the like, so that the devices are displaced along the rails 200, 202 at predetermined distances from one another.

As seen in the direction of the arrow 220, the bottom side 206 of the guide rail 202 moves in steps to a lower position with respect to the body 166, with the result that the wheel 176c rolling along the bottom side 206 of the guide rail 202 (and the wheel 176d which is coupled to the wheel 176c via the coupling body 192) is displaced downwards with respect to the body 166. As a result, the arm 184 also moves downwards, and the carrier 160 pivots in the anticlockwise direction. FIG. 16 shows two different angular positions of the carrier 160 which can be reached in this way. Similar pivoting of the carrier has already been shown in and discussed with reference to FIGS. 12a and 12b.

FIG. 17 illustrates the pivoting movement of the carrier 160 as the bottom side 206 of the guide rail 200 becomes lower in steps (as seen in the direction of the arrow 220), during which process the said bottom side 206 displaces the wheel 176a (and the wheel 176b which is coupled thereto via the coupling body 190) downwards with respect to the body 166. As a result, the arm 186 also moves downwards, and the carrier 160 pivots in the clockwise direction. Pivoting of this nature has already been discussed above with reference to FIGS. 13a and 13b.

Figure 17A:
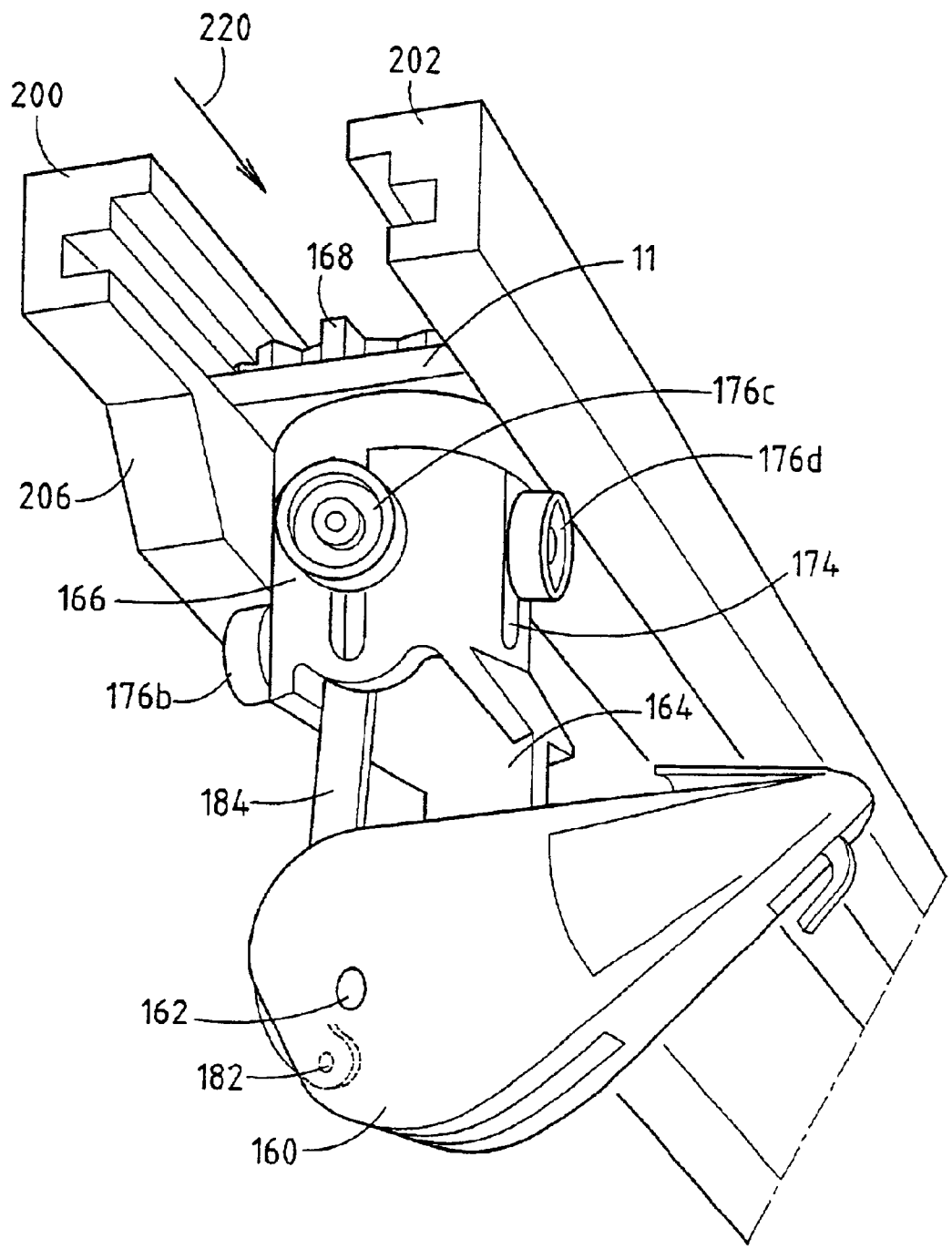
FIG. 17a shows a perspective view of the embodiment shown in FIG. 10, in a specific operating position.

FIG. 17a shows the carrier 160, the angular position of which can be set by the arms 184 and 186, the arm 160, unlike in the previous Figures, being pivotably coupled to a coupling body which couples the wheels 176a and 176b to one another, and the arm 186 being pivotably coupled to a coupling body which pivotably couples the wheels 176c and 176d to one another. Consequently, the lowering of the bottom side 206 of the guide rail 200 with respect to the body 166, as seen in the direction of the arrow 220, causes the wheel 176b to be moved downwards, and this moves the arm 184 downwards, so that the carrier 160 can adopt a substantially horizontal position.

Figure 18A:
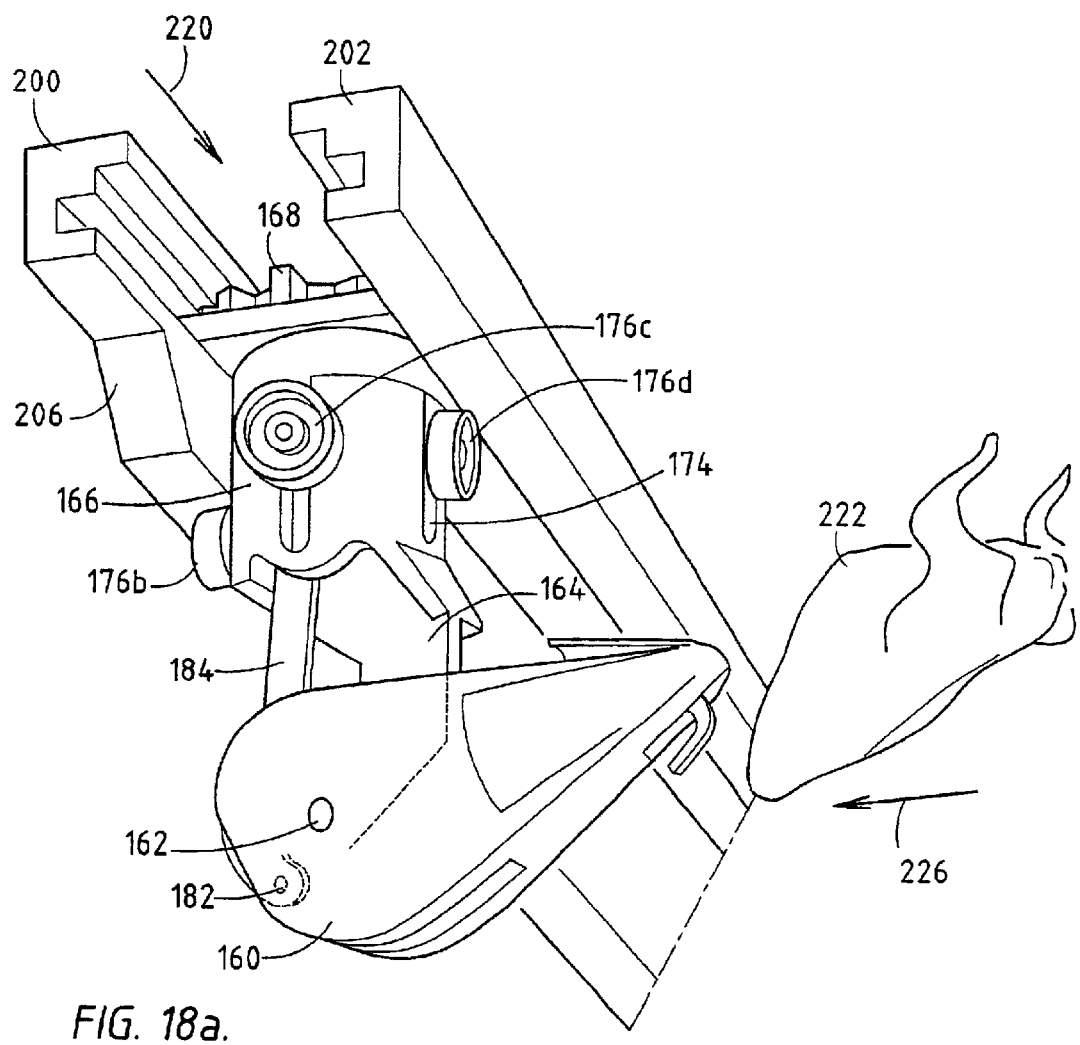
Figure 18B:
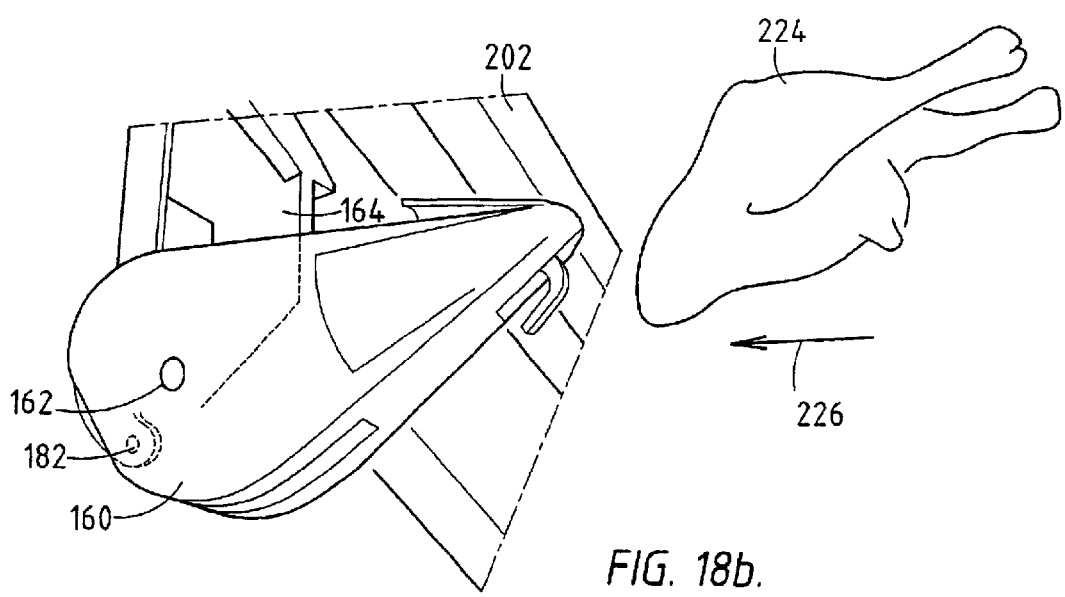

As is then illustrated by FIGS. 18a and 18b, the angular position of the carrier 160 can be used to excellent effect for placing a front half 222 (FIG. 18a) or a rear half 224 (FIG. 18b) of poultry onto the carrier 160, as indicated by an arrow 226.

Figure 19B:
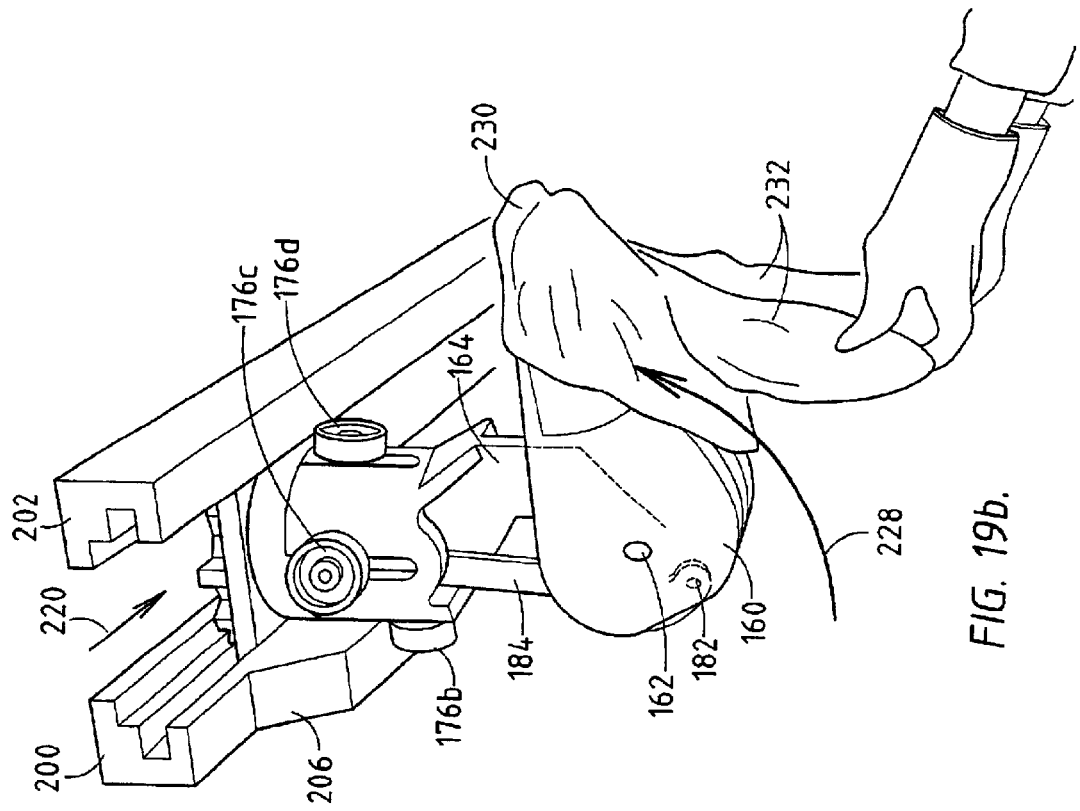
FIGS. 19a and 19b show perspective views of part of a filleting operation with the aid of the exemplary embodiment shown in FIG. 10.
Figure 19A:
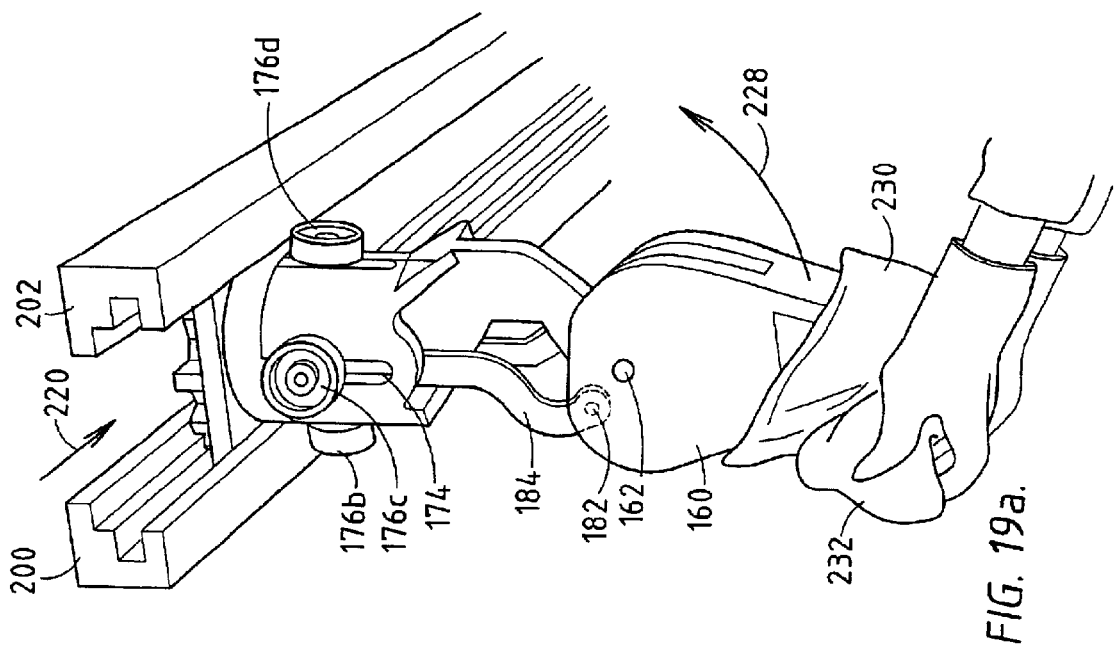

As illustrated by FIGS. 19a and 19b, a change in the angular position of the carrier 160 in the direction of arrow 228 as a result of the wheel 176b being moved downwards can be used for a manual filleting operation. FIG. 19a shows how the hands take hold of breast fillets 232 on two sides of a breast portion 230 of slaughtered poultry. As illustrated by FIG. 19b, the vertical position of the hands then does not have to be changed further, and the upwards pivoting of the carrier 160 leads to the breast fillets 232 being at least partially pulled off the breast portion 230. It will be clear that the breast fillets 232, in the position shown in FIG. 19a, can also be gripped by mechanical means which move along with the carrier 160 in the direction of the arrow 220, in order to bring about a filleting operation of this nature.

Figure 20A:
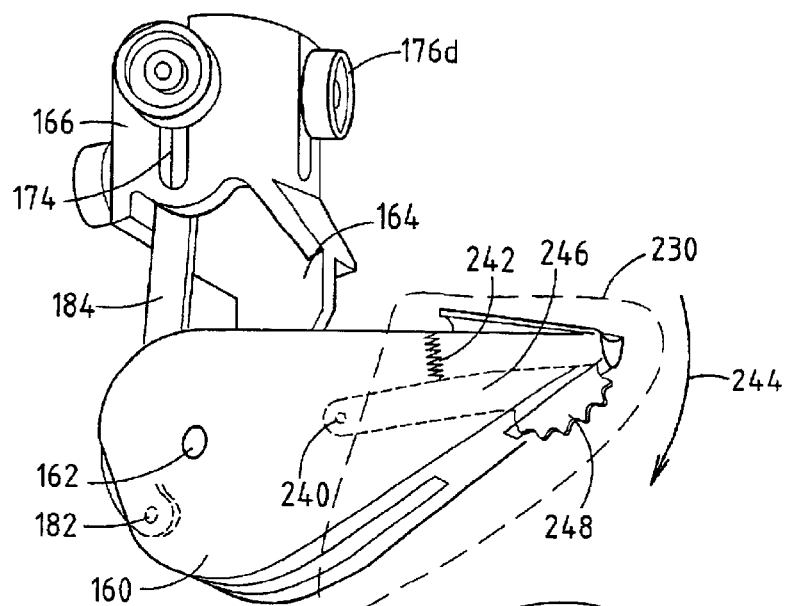
FIGS. 20a, 20b and 20c show perspective views of various slaughter product fixing means.

FIG. 20a shows the carrier 160 in which, in order to fix a breast portion 230 which is only diagrammatically indicated by dashed lines, there is a fixing means in the form of an arm 246 which can pivot about a shaft 240, under prestress from a spring 242, in the direction of arrow 244 and has a knurled end 248. When the breast portion 230 is being placed onto the carrier 160, the knurled end 248 is pushed away towards the carrier 160, while the knurled end 248 then penetrates to some extent into the breast portion 230 and thus prevents the breast portion 230 from being able to slide off the carrier 160.

Figure 20B:
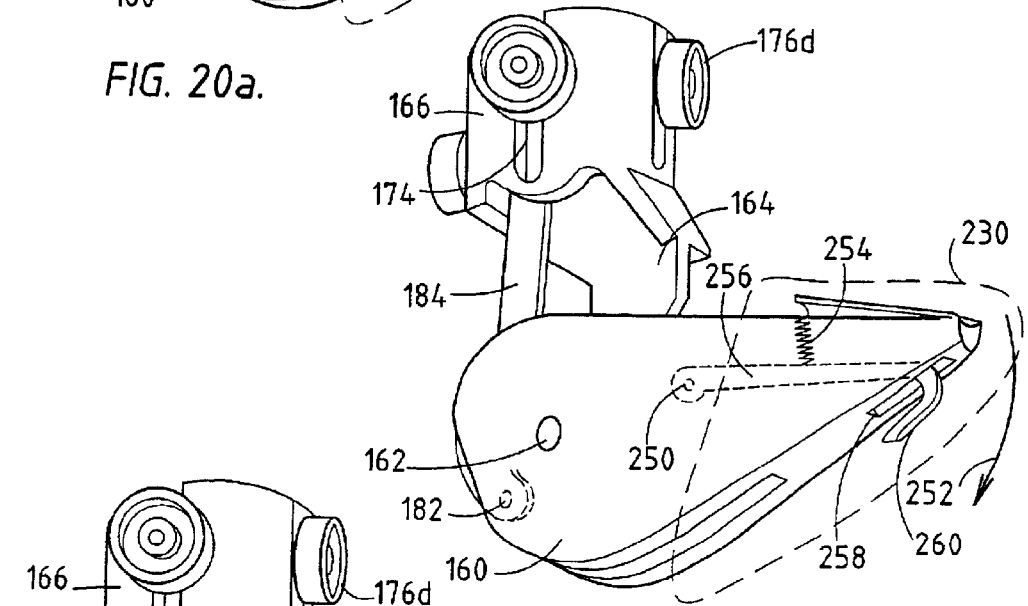

The carrier 160 shown in FIG. 20b contains a fixing element in the form of an arm 256, which can pivot about a shaft 250 in the direction of arrow 252, under prestress from a spring 254, and, at its end, is provided with a hook 260 which projects outwards through an opening 258 in the carrier 160. When the breast portion 230 is being placed onto the carrier 160, the hook 260 is pressed into the opening 258 but, as soon as it has an opportunity, the hook 260 will move outwards in the direction of the arrow 252 and will thus prevent the breast portion 230 from sliding off the carrier 160 in the opposite direction.

Figure 20C:
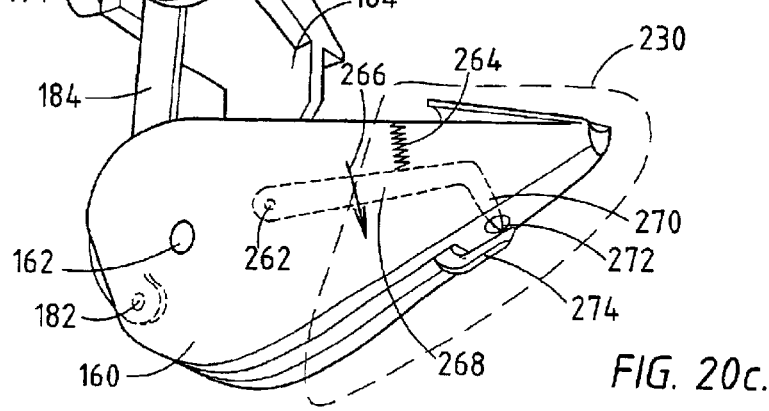

FIG. 20c shows a carrier 160 which, in the first place, is provided with an arm 268 which can pivot about a shaft 262, under prestress from a spring 264, in the direction of arrow 266 and has a pointed end 270 which, via an opening 272, can project outwards through the surface of the carrier 160. This movement is delimited by a hook 274 which is fixedly attached to the surface of the carrier 160 opposite the opening 272. When a breast portion 230 is being placed onto the carrier 160, its breast bone will slide under the hook 274, during which period the pointed end 272 is pressed away counter to the prestress of the spring 264. Then, the pointed end 272 will penetrate a certain distance into the breast bone of the breast portion 230 and will thus fix the breast portion 230 on the carrier 160 together with the hook 274.

FIG. 21 shows a carrier 160 which is illustrated by dashed lines and contains an externally actuable fixing element 278 which comprises a hook 276. The fixing element 278 also comprises an angled arm 280 which is mounted in such a way that it can pivot about the shaft 162. The arm is provided with an actuating protrusion 282. An arm 284 can also pivot with respect to the shaft 162 and is provided with an actuating protrusion 286. The arm 284 is coupled to an arm 290, which at its end bears the hook 276, in such a manner that it can pivot about a shaft 288. The arm 290 is provided with a slot 292. The arms 280 and 290 are connected to one another by means of a coupling element 294 which is provided with a first shaft 296 which fits into a slot 298 in the arm 280, and a second shaft 300 which fits into the slot 292 in the arm 290. The coupling element 294 is connected to the carrier in such a manner that it can rotate about a shaft 295. The way in which the fixing element 278 operates will be explained in more detail below with reference to FIGS. 22a–22d.

FIG. 21a illustrates that pins 304, which help to fix a slaughter product by means of the hook 276, are arranged on either side of an opening 302 in the carrier 160.

Figure 22A:
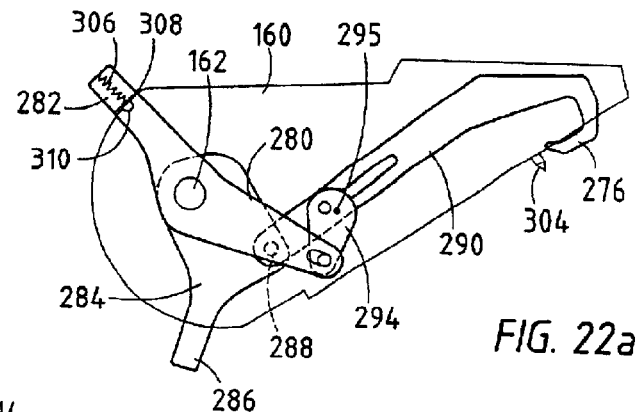
FIGS. 22a, 22b, 22c and 22d show side views of various positions of the hook-actuation mechanism shown in FIG. 21.

FIG. 22a shows a starting position of the fixing element 278, in which the hook 276 has been moved at least partially into the carrier 160, so that a breast portion 230 can easily be slid onto the carrier 160. As illustrated for the actuating protrusion 282, the position of the actuating protrusion 282 can be fixed with the aid of a spring 306 and ball 308 accommodated therein, by providing the carrier 160 with recesses 310 which are intended to interact with the ball 308 at predetermined locations. A similar position-fixing system is possible for the actuating protrusion 286.

Figure 22B:
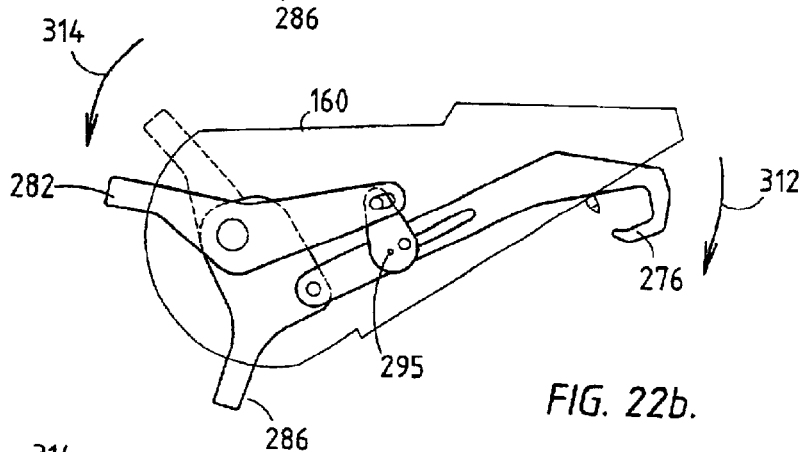

As illustrated by FIG. 22b, the hook 276 is moved out of the carrier 160 in the direction of arrow 312 in the event of displacement of the actuating protrusion 284 out of the position indicated by a dashed line into the position shown by a solid line, in the direction of arrow 314.

Figure 22C:
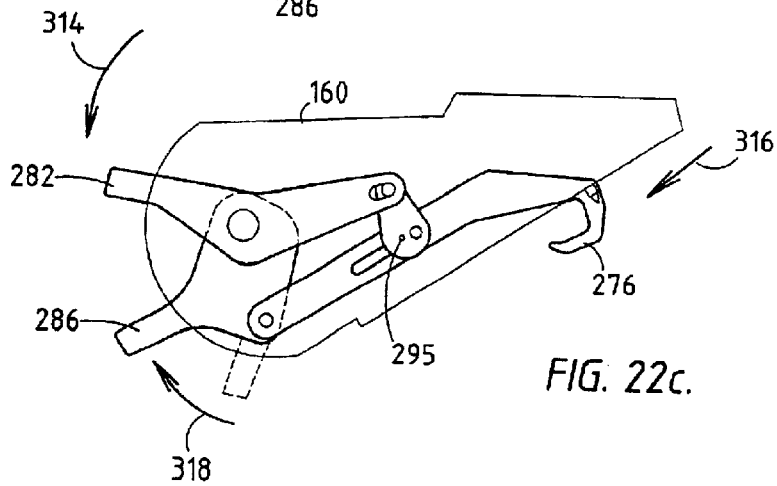

As illustrated by FIG. 22c, the hook 276 is displaced in the direction of arrow 316 when the actuating protrusion 286 is displaced out of the position indicated by a dashed line into the position illustrated by solid lines, in the direction of arrow 318.

Figure 22D:
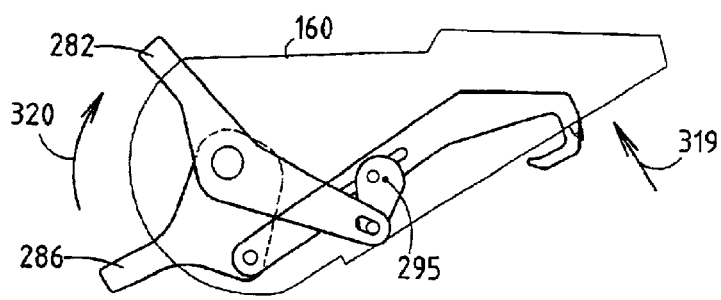

Finally, as illustrated by FIG. 22d, the hook 276 is moved back towards the carrier 160, in the direction of arrow 319, as a result of the actuating protrusion 282 being displaced out of the position shown in FIG. 22c in the direction of arrow 320.

If, in the situation shown in FIG. 22a, a breast portion 230 is placed onto the carrier 160, this breast portion is then clamped firmly onto the carrier 160 as a result of the hook movement being controlled as shown in FIGS. 22b–22d.

FIGS. 23 and 24 in particular show means for fixing a slaughter product on the carrier 160. In the embodiment shown in FIG. 23, a front half 330 of poultry is clamped onto the carrier 160 by one or more arms 332 which can pivot about a shaft 334 and are driven towards the carrier 160 under a mechanical prestress. In the process, an end 336, which is provided with sharp ribs, of the arm 332 engages on the outside of the front half 330, so that the front half 330 cannot move with respect to the carrier 160 while an operation is being carried out on the front half 330.

FIG. 24 shows a front half 338 of poultry without wings which is arranged on the carrier 160. Above the carrier 160 there is an arm 342 which can pivot about a shaft 340 and is driven towards the carrier 160 under a mechanical prestress generated, for example, by a spring which is not shown in more detail. In the situation shown, the arm 342 is provided with an end 344 which has sharp ribs which engage on the outside of the front half 338. The arm 342 is mounted on a support 346 which is fixedly connected to the body 166. It will be clear that the fixing of the front half 338 which is brought about by the arm 342 only takes place after the carrier 160 has been pivoted sufficiently far upwards in the direction of the arm 342, and that the fixing is inactive if the carrier 160 adopts other positions.

Figure 25:
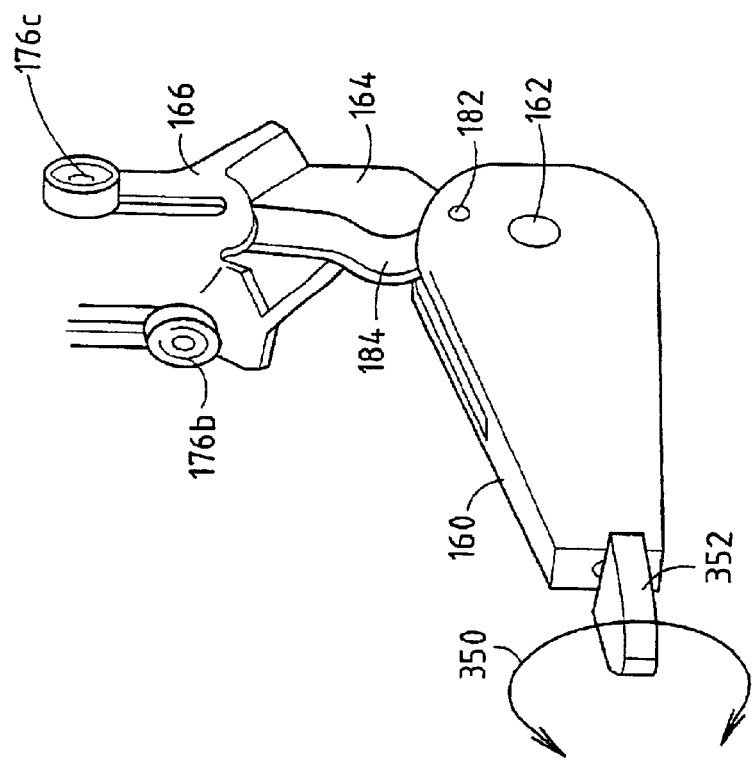
FIG. 25 shows a perspective view of yet another embodiment of the slaughter product fixing means.

FIG. 25 shows a carrier 160 which, at its free end, is provided with a part 352 which can rotate, by means of a drive (not shown in more detail), about a longitudinal axis of the carrier 160, in the directions of double arrow 350. The part 352 clamps a slaughter product, such as a front half of a bird, firmly on the carrier 160 on the inside, so that the slaughter product is fixed on the carrier 160.

Figure 26:
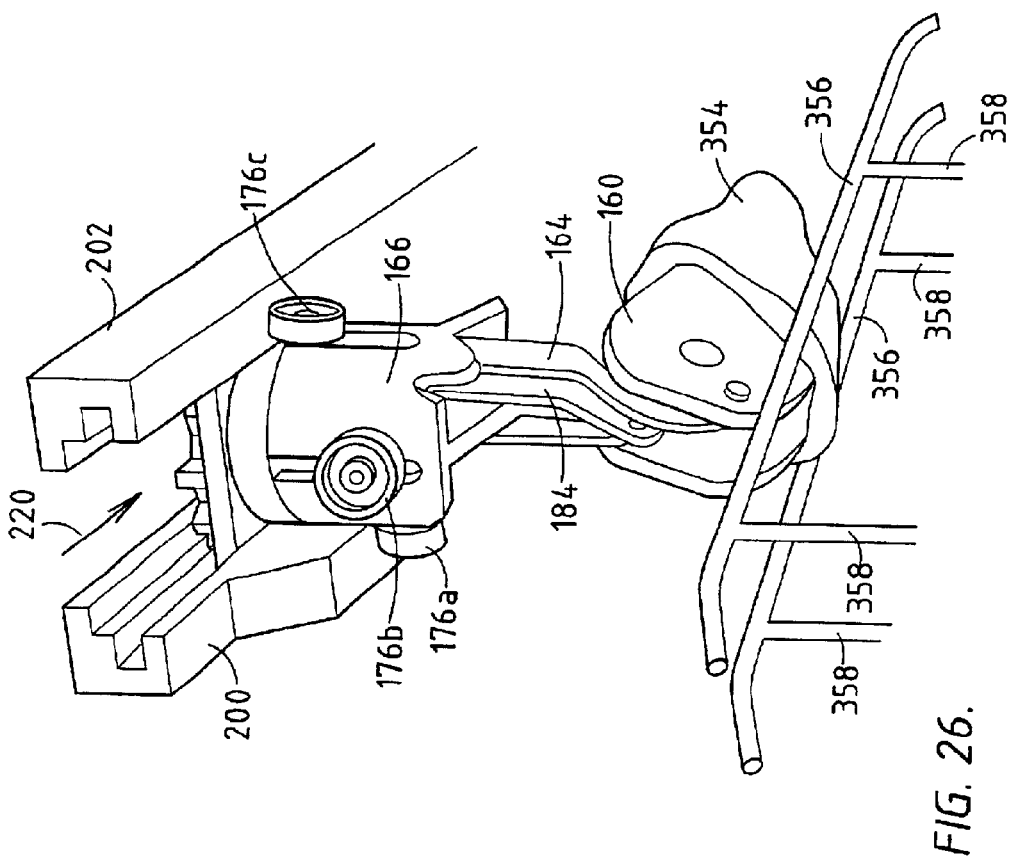
FIGS. 26, 27, 28 and 29 show slaughter product fixing means arranged along the path of the conveyor.

FIG. 26 shows an exemplary embodiment of external fixing of a slaughter product, in this case a front half 354, on the carrier 160. Fixing bars 356 extend beneath the guide rails 200, 202, substantially in the direction of the guide rails 200, 202. The fixing bars 356 are arranged in a stationary position and are connected to a frame (not shown in more detail) by means of supports 358. The friction which is generated between the front half 354 and the fixing bars 356 in the event of a movement of the carrier 160 in the direction of the arrow 220 ensures that the front half 354 is fixed on the carrier.

Figure 27:
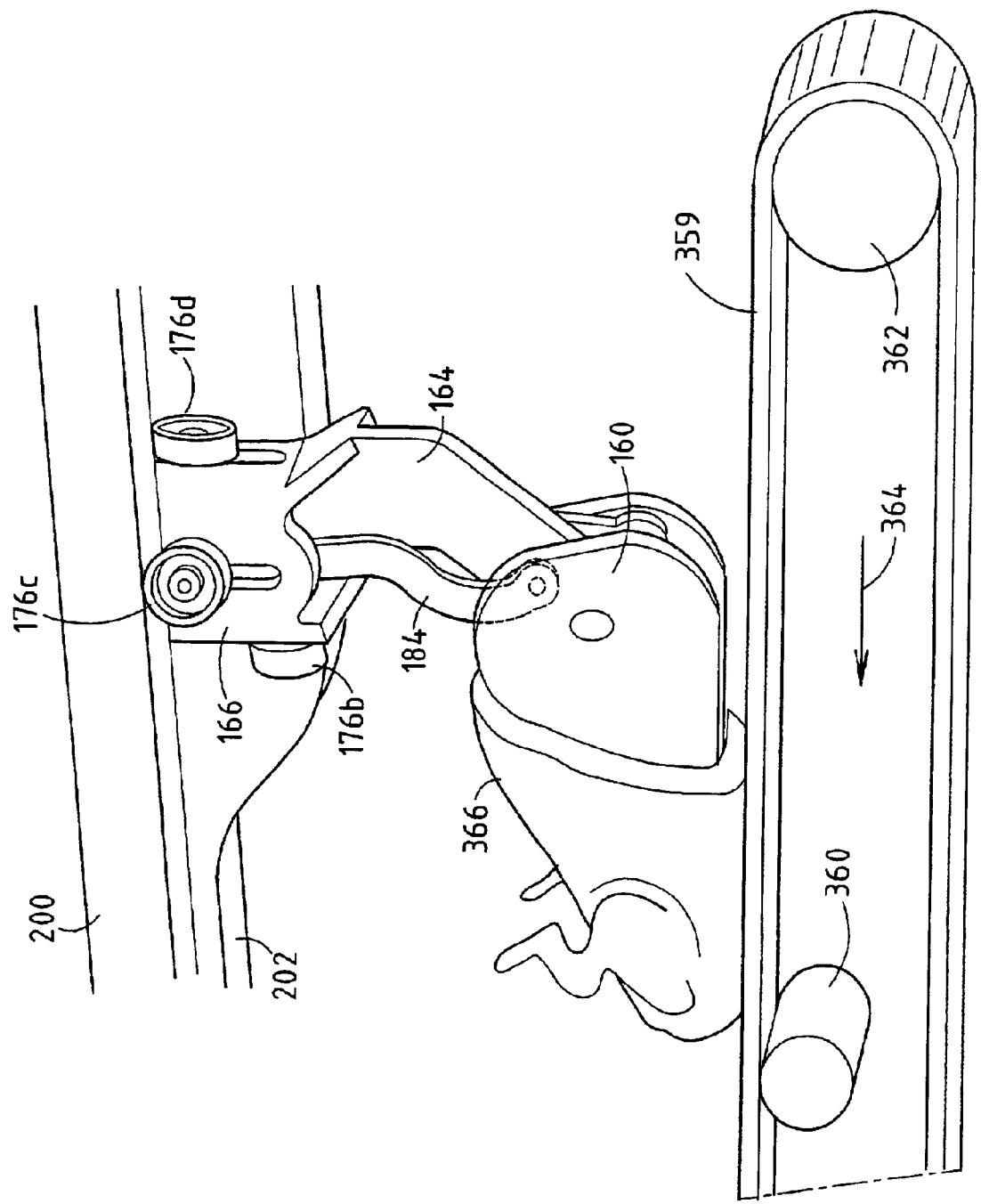

FIG. 27 shows an endless belt 359 which is arranged beneath the guide rails 200, 202, extends substantially in the direction of the guide rails 200, 202, is mounted on and around rollers 360, 362 and is driven, in a manner which is not shown in more detail, in the direction of arrow 364. The carrier 160 also moves in the direction of the arrow 364, the speed of the belt 359 being equal to or slightly lower than that of the carrier 160. Consequently, a front half 366 arranged on the carrier 160 is fixed with respect to the carrier 160 as a result of the frictional force which will be applied via frictional contact between the belt 359 and the front half 366.

Figure 28:
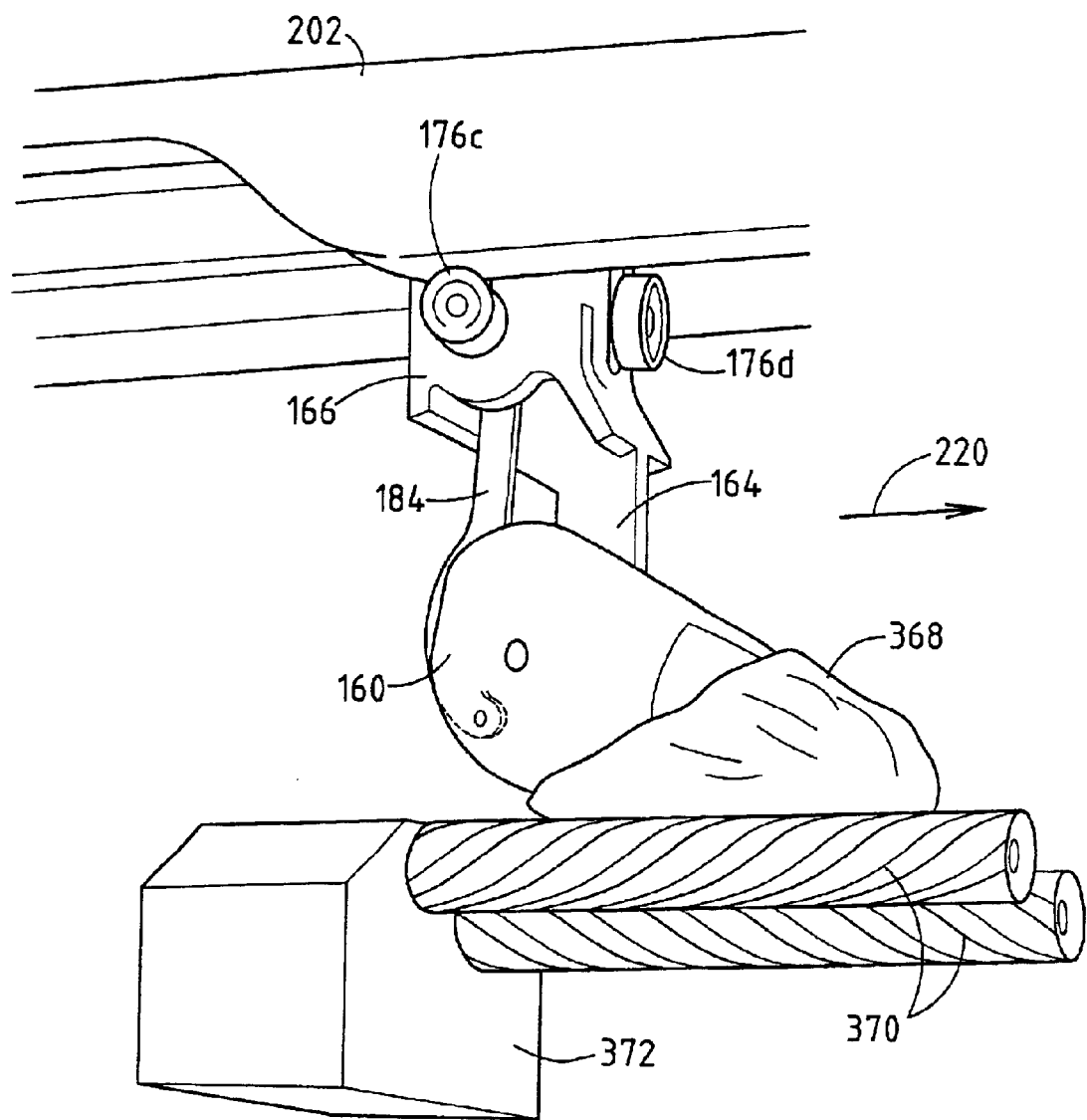

FIG. 28 illustrates the way in which a slaughter product, in this case a front half 368 of poultry, is fixed on the carrier 160 by means of processing tools, in this case skinning rollers 370, which are driven in opposite directions to one another by a drive 372 (not shown in more detail). The drive 372 is arranged stationary, so that the front half 368, in the event of movement in the direction of the arrow 220 and contact with the skinning rollers 370, is subjected to a force which is directed oppositely to the direction of the arrow 220 and fixes the front half 368 on the carrier.

Figure 29:
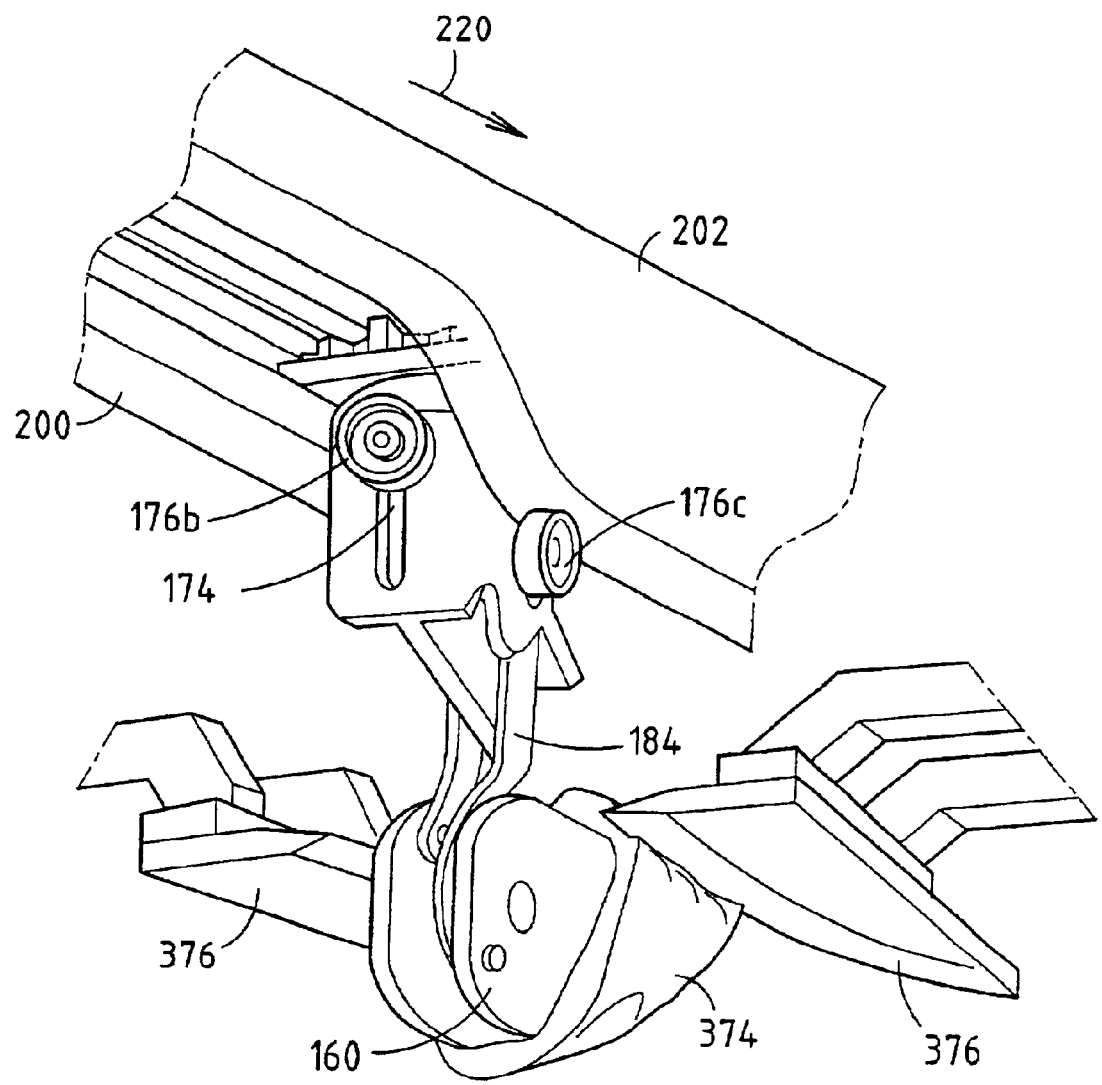

FIG. 29 shows a carrier 160 which is conveyed in the direction of the arrow 220 and on which, by way of example, a front half 374 is arranged. The carrier 160 is guided along stationary arranged cutting devices 376, an incision being made in the front half 374. The cutting forces exerted on the front half 374 by the cutting devices 376 when the carrier moves past ensure that the slaughter product is fixed on the carrier 160.

Figures 30A, 30B:
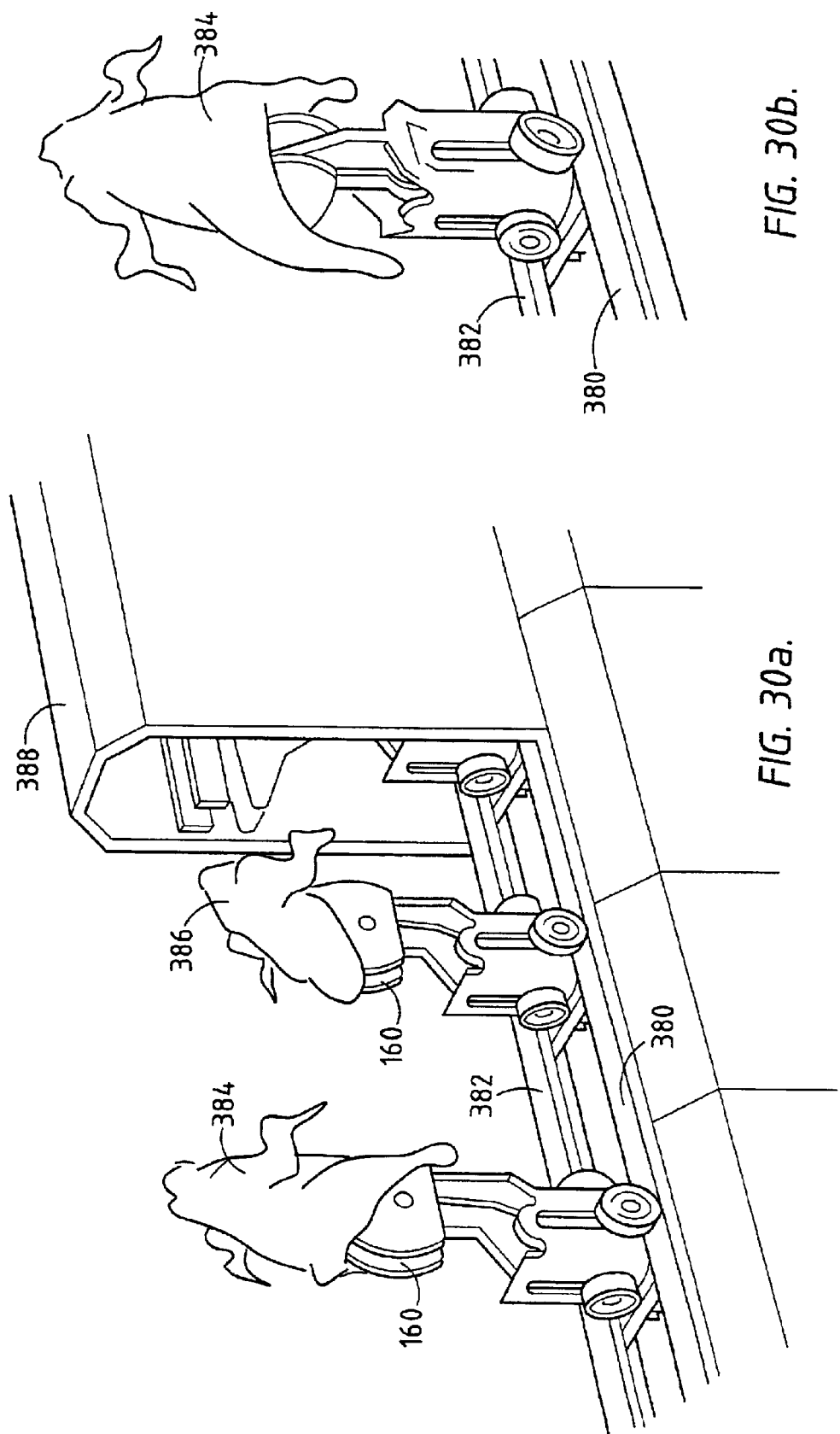
FIGS. 30a and 30b show perspective views of the use of devices similar to that shown in FIG. 10 for the processing of slaughter products.

FIGS. 30a and 30b illustrate the possibility of using the carriers and the actuating means not only in a suspended position (as shown above) but also in the opposite orientation, resting on guide rails 380, 382. In the example shown, carcasses 384 and/or front halves 386 are conveyed on carriers 160, for example in order to be subjected to a processing operation in a processing station 388.

Figure 31A:
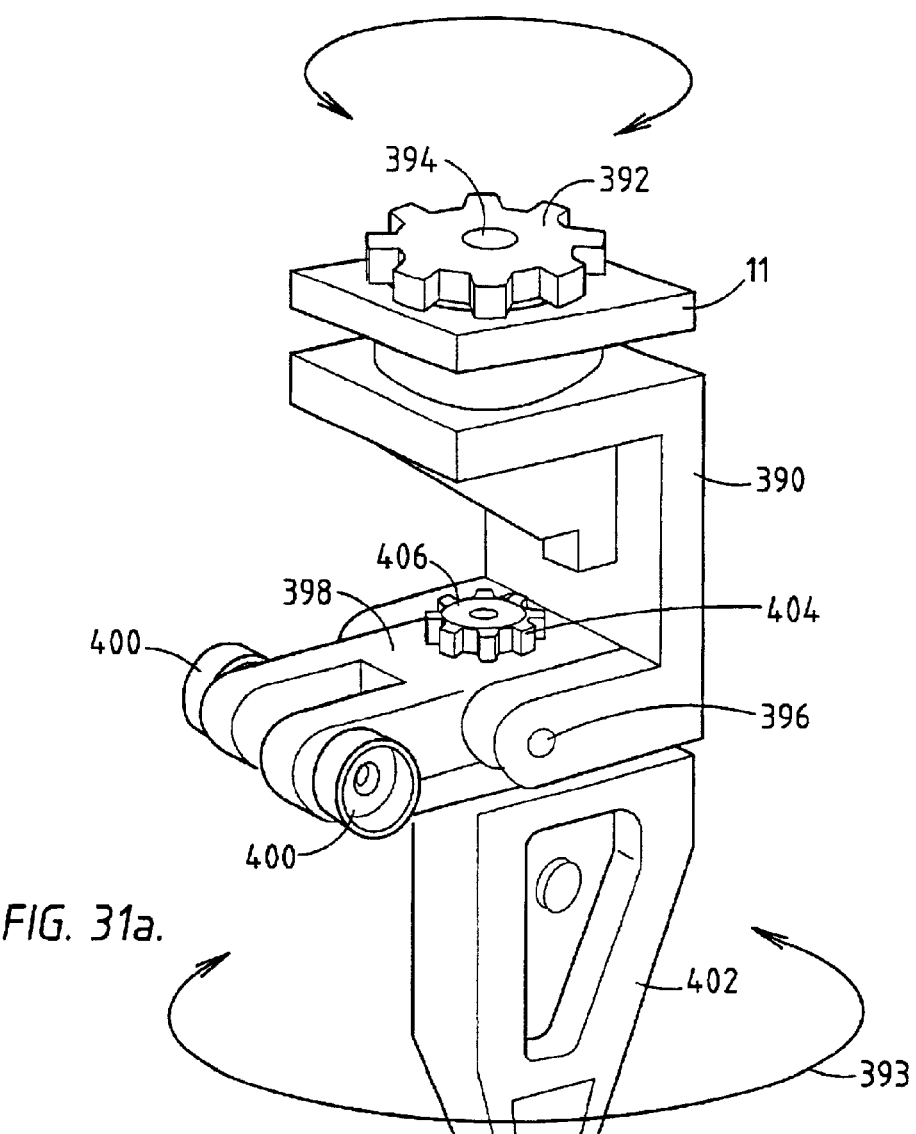
FIG. 31a shows a perspective view of another exemplary embodiment of the device according to the invention.
Figure 31B:
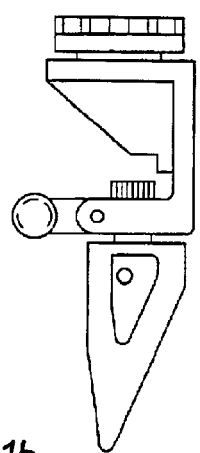
FIGS. 31b and 31c show side views of the exemplary embodiment shown in FIG. 31a, in different operating positions.
Figure 31C:
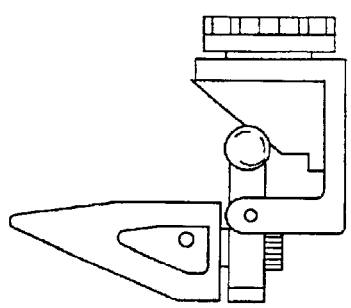

FIGS. 31a, 31b and 31c show a body 390 which is fixedly connected to a gearwheel 392 and can rotate about a shaft 394 in the directions of double arrow 393, with respect to a positioning member 11. As a result of the gearwheel 392 being rotated with respect to the positioning member 11, it is possible to set an angular position of the body 390 about the shaft 394.

The body 390 is connected to a body 398, which is provided with freely rotating wheel 400, in such a manner that it can pivot about a shaft 396. A carrier 402 is fixedly connected to a gearwheel 404 and can rotate about a shaft 406 with respect to the body 398. In this case, the angular position of the carrier 402 with respect to the body 398 can be set as a result of the gearwheel 404 being guided along a toothed structure. Preferably, the body 398 is provided with means (not shown in more detail) for retaining an angular position of the carrier 402 which has been set by the toothed structure. The angular position of the body 398 with respect to the shaft 396 can be set by displacing the wheels 400 in a control slot of a suitable control element (not shown in more detail). FIGS. 31b and 31c show two different angular positions which can be set in this way. Preferably, the body 390 or 398 is provided with means for retaining an angular position once it has been set.

The structure shown in FIGS. 31a, 31b and 31c provides three degrees of freedom for manipulation of a slaughter product.

While the invention has been described and illustrated in its preferred embodiments, it should be understood that departures may be made therefrom within the scope of the invention, which is not limited to the details disclosed herein.

We claim:

1. Device for processing a slaughter product, comprising:
   a conveyor for moving the slaughter product along a path;
   a first body pivotably connected to the conveyor so that it can rotate about a first axis;
   a second body pivotably connected to the first body so that it can rotate about a second axis;
   a first actuating device for positioning the first body in various first angular positions with respect to the first axis;
   a second actuating device for positioning the second body in multiple second angular positions with respect to the second axis, wherein the second angular positions of the second body are independent of the first angular positions of the first body while the first body is in at least two different first angular positions;
   a locking device for maintaining the first body in a first angular position or the second body in a second angular position; and
   a slaughter product fixing device for fixedly connecting the slaughter product to the second body.

2. The device of claim 1, wherein the locking device comprises:
   a first locking device for maintaining the first body in a first angular position; and
   a second locking device for maintaining the second body in a second angular position;
   wherein the first locking device is formed by the first actuating device.

3. The device of claim 1, wherein the locking device comprises:
   a first locking device for maintaining the first body in a first angular position; and
   a second locking device for maintaining the second body in a second angular position;
   wherein the second locking device is formed by the second actuating device.

4. The device of claim 1, wherein the first body further comprises a gearwheel, and the first actuating device comprises at least one toothed structure positioned along the path of the conveyor to engage the gearwheel.

5. The device of claim 1, wherein the second actuating device comprises a crankshaft mechanism comprising at least one crank.

6. The device of claim 5, wherein the second actuating device comprises at least one actuating protrusion that engages a slot of an actuating element arranged along the path of the conveyor for actuating the at least one crank.

7. The device of claim 5, wherein the crankshaft mechanism comprises a first crank and a second crank each positioned in a plane perpendicular to the second axis and engaging on the second body at an angle relative to one another with respect to the second axis, the angle being other than 0 degrees.

8. The device of claim 5, wherein each crank comprises at least two actuating protrusions for actuating the crankshaft mechanism while the first body is positioned in at least two different first angular positions.

9. The device of claim 1, further comprising:
   a third actuating device for positioning the second body in multiple third angular positions with respect to a third axis; and
   a third locking device for maintaining the second body in a third angular position.

10. The device of claim 9, wherein the second body has a longitudinal axis, and wherein the third axis is oriented substantially parallel to the longitudinal axis of the second body.

11. The device of claim 1, further comprising a slaughter product carrier coupled to the second body, and wherein the slaughter product fixing device is adapted to couple the slaughter product to the slaughter product carrier.

12. The device of claim 1, wherein the slaughter product fixing device is arranged along the path of the conveyor.

13. A device for processing a slaughter product, comprising:
   a conveyor for moving the slaughter product along a path;
   a first body connected to the conveyor so that it can rotate about a first axis;
   a second body connected to the first body so that it can rotate about a second axis;
   first actuating means for positioning the first body in multiple first angular positions with respect to the first axis;
   second actuating means for positioning the second body in multiple second angular positions with respect to the second axis, wherein the second angular positions of the second body are independent of the first angular positions of the first body;
   locking means for maintaining the first body in a first angular position or the second body in a second angular position; and
   slaughter product fixing means for fixedly connecting a breast portion of the slaughter product to the second body.

14. The device of claim 13, wherein the locking means comprises:
   a first locking means for maintaining the first body in a first angular position; and
   a second locking means for maintaining the second body in a second angular position,
   wherein the first locking means is formed by the first actuating means.

15. The device of claim 13, wherein the locking means comprises:
   a first locking means for maintaining the first body in a first angular position; and
   a second locking means for maintaining the second body in a second angular position,
   wherein the second locking means is formed by the second actuating means.

16. The device of claim 13, wherein the locking means are positioned along the path of the conveyor.

17. The device of claim 16, wherein the locking means are adapted to engage the slaughter product.

18. The device of claim 13, wherein substantially the entire second body is positioned beneath the first body in at least one of the second angular positions.

19. The device of claim 13, wherein the conveyor is an overhead conveyor.

20. The device of claim 13, wherein the first axis is substantially vertical.

21. The device of claim 13, wherein the second axis is substantially perpendicular to the first axis.

22. The device of claim 13, wherein the first axis and the second axis are separated by a distance of at most about 0.1 meters.

23. The device of claim 13, wherein the first body comprises at least one projection positioned substantially perpendicular to the first axis.

24. The device of claim 23, wherein the first actuating means comprises at least one stop positioned along the path of the conveyor for engaging the at least one projection.

25. The device of claim 13, wherein the first body further comprises a gearwheel, and the first actuating means comprise at least one toothed structure positioned along the path of the conveyor to engage the gearwheel.

26. The device of claim 25, wherein the gearwheel comprises a first section of a circumference of the gearwheel and a second section of the circumference of the gearwheel, wherein the first section comprises teeth to engage the toothed structure of the first actuating means.

27. The device of claim 26, wherein the gearwheel further comprises a protrusion positioned adjacent to the second section of the gearwheel for blocking rotation of the first body about the first axis in one direction of rotation.

28. The device of claim 26, wherein a height of the gearwheel comprises a first portion and a second portion adjacent the first portion, wherein the first portion comprises the first section and the second section and the second portion comprises teeth.

29. The device of claim 25, wherein the first actuating means comprises two toothed structures that each engage the gearwheel at a different height of the gearwheel.

30. The device of claim 13, wherein the second actuating means comprises a crankshaft mechanism comprising at least one crank.

31. The device of claim 30, wherein the second actuating means comprises at least one actuating protrusion that engages a slot of an actuating element arranged along the path of the conveyor for actuating the at least one crank.

32. The device of claim 30, wherein the crankshaft mechanism comprises a first crank and a second crank each positioned in a plane perpendicular to the second axis and engaging on the second body at an angle relative to one another with respect to the second axis, the angle being other than 0 degrees.

33. The device of claim 30, wherein each crank comprises at least two actuating protrusions for actuating the crankshaft mechanism while the first body is positioned in at least two different first angular positions.

34. The device of claim 13, further comprising:
third actuating means for positioning the second body in multiple third angular positions with respect to a third axis; and
third locking means for maintaining the second body in a third angular position.

35. The device of claim 34, wherein the second body has a longitudinal axis, and wherein the third axis is oriented substantially parallel to the longitudinal axis of the second body.

36. The device of claim 13, wherein the slaughter product fixing means are arranged along the path of the conveyor.

37. The device of claim 36, wherein the slaughter product fixing means comprise at least one guide rail extending generally in the direction of the path of the conveyor and positioned along the path of the conveyor to contact the slaughter product.

38. The device of claim 36, wherein the slaughter product fixing means comprise at least one belt positioned along the path of the conveyor and extending generally in the direction of the path of the conveyor, wherein one surface of the belt is adapted to move in the direction of the conveyor and contact the slaughter product.

39. The device of claim 36, wherein the slaughter product fixing means comprise at least one slaughter product processing means extending generally in the direction of the path of the conveyor and positioned along the path of the conveyor to contact the slaughter product to process the slaughter product.

40. The device of claim 13, wherein the first body comprises at least one recess positioned substantially perpendicular to the first axis.

41. The device of claim 40, wherein the first actuating means comprises at least one stop positioned along the path of the conveyor for engaging the at least one recess.

42. Device for processing a slaughter product, comprising:
a conveyor for moving the slaughter product along a path;
a first body connected to the conveyor so that it can rotate 360° about a first axis;
a second body pivotably connected to the first body so that it can rotate at least 180° about a second axis;
a first actuating device for positioning the first body in various first angular positions with respect to the first axis;
a second actuating device for positioning the second body in multiple second angular positions with respect to the second axis,
a locking device for maintaining the first body in a first annular position or the second body in a second angular position; and
a slaughter product fixing device for fixedly connecting the slaughter product to the second body.

43. A device for processing a slaughter product, comprising:
a coupling yoke capable of moving along a rail;
a first body connected to the coupling yoke so that it can rotate 360° about a first axis;
a second body connected to the first body so that it can rotate at least 180° about a second axis;
a first actuating element connected to the first body for positioning the first body in multiple first angular positions with respect to the first axis;
a second actuating element connected to the second body for positioning the second body in multiple second angular positions with respect to the second axis; and
a slaughter product fixing device for fixedly connecting a breast portion of the slaughter product to the second body.

44. A device for processing a slaughter product, comprising:
a coupling yoke capable of moving along a rail;
a first body connected to the coupling yoke so that it can rotate about a first axis;
a second body connected to the first body so that it can rotate about a second axis;
a first actuating element connected to the first body for positioning the first body in multiple first annular positions with respect to the first axis;
a second actuating element connected to the second body for positioning the second body in multiple second angular positions with respect to the second axis; and
a slaughter product fixing device for fixedly connecting a breast portion of the slaughter product to the second body.

* * * * *